United States Patent [19]

Shetty et al.

[11] Patent Number: 5,794,014

[45] Date of Patent: Aug. 11, 1998

[54] METHOD AND APPARATUS FOR INTERFACING BETWEEN PERIPHERALS OF MULTIPLE FORMATS AND A SINGLE SYSTEM BUS

[75] Inventors: Suhas Anand Shetty, Sunnyvale; Daniel G. Bezzant, Pleasonton, both of Calif.

[73] Assignee: Cirrus Logic, Inc., Fremont, Calif.

[21] Appl. No.: 872,330

[22] Filed: Jun. 10, 1997

Related U.S. Application Data

[63] Continuation of Ser. No. 386,818, Feb. 10, 1995, abandoned, which is a continuation-in-part of Ser. No. 266,975, Jun. 27, 1994, abandoned.

[51] Int. Cl.⁶ .................................................. G06F 13/00
[52] U.S. Cl. .................................................. 395/500
[58] Field of Search ................................... 395/500, 309

[56] References Cited

U.S. PATENT DOCUMENTS

| | | |
|---|---|---|
| 4,075,693 | 2/1978 | Fox et al. |
| 4,106,092 | 8/1978 | Millers, II |
| 4,268,906 | 5/1981 | Bourke et al. |
| 4,313,160 | 1/1982 | Kaufman et al. |
| 4,371,932 | 2/1983 | Dinwiddie et al. |
| 4,415,986 | 11/1983 | Chadra |
| 4,484,263 | 11/1984 | Olson et al. |
| 4,509,113 | 4/1985 | Heath |
| 4,538,224 | 8/1985 | Peterson ............... 395/425 |
| 4,592,012 | 5/1986 | Braun |
| 4,631,666 | 12/1986 | Harris et al. |
| 4,683,534 | 7/1987 | Tietjen et al. |
| 4,716,525 | 12/1987 | Gilanyi et al. |
| 4,727,475 | 2/1988 | Kiremidjian |
| 4,747,047 | 5/1988 | Coogan et al. |
| 4,775,931 | 10/1988 | Dickie et al. ............ 364/200 |
| 4,805,090 | 2/1989 | Coogan |
| 4,807,282 | 2/1989 | Kazan et al. ............ 379/284 |
| 4,935,894 | 6/1990 | Ternes et al. |
| 5,025,412 | 6/1991 | Dolrymple et al. ...... 395/500 |
| 5,038,320 | 8/1991 | Heath et al. |
| 5,150,465 | 9/1992 | Bush et al. ............... 395/275 |
| 5,175,536 | 12/1992 | Aschliman et al. ...... 340/825.04 |

(List continued on next page.)

FOREIGN PATENT DOCUMENTS 0 628 913 A1   6/1994   European Pat. Off.

OTHER PUBLICATIONS

Rockwell International R65C00/21 Dual CMOS Microcomputer and R65C29 Dual CMOS Microprocessor Data Book, pp. 3–22 through 3–24, Aug. 1983.

*Primary Examiner*—Kevin J. Teska
*Assistant Examiner*—Ayni Mohamed
*Attorney, Agent, or Firm*—Haverstock & Associates; Robert P. Sabath; Frank D. Nguyen

[57] ABSTRACT

A peripheral interface system and apparatus including a pair of integrated circuits, referred to as a system adapter and a socket controller, use a communication protocol, referred to as a windowed-interchip-communication protocol, to interface peripherals, such as PCMCIA cards or infrared devices, and other subsystems having different formats with a CPU system bus. The system adapter communicates to a hard disk drive subsystem using the ATA communication standards to interface an ATA hard disk drive with the CPU system bus. Communication between the system adapter and the socket controller, which communicates with PCMCIA peripheral cards and IR peripherals, is accomplished using the windowed-interchip-communication protocol which may share hardware resources with other communication protocols. Communication between the system adapter and the hard disk drive and between the system adapter and the socket controller may be provided on the same chain of a standard 40 signal ribbon cable. Status detection logic circuitry is included within the socket controller for detecting changes in status of selected signals and notifying the system adapter of the changes in status. This status detection logic circuitry ensures that multiple changes of status of the selected signals are recorded and reported to the system adapter in the order in which the changes occurred.

2 Claims, 22 Drawing Sheets

U.S. PATENT DOCUMENTS

| | | | |
|---|---|---|---|
| 5,191,653 | 3/1993 | Banks et al. | 395/275 |
| 5,245,703 | 9/1993 | Hubert | 395/200 |
| 5,255,376 | 10/1993 | Frank | 395/325 |
| 5,263,172 | 11/1993 | Olnowich | 395/800 |
| 5,264,958 | 11/1993 | Johnson | 395/325 |
| 5,265,252 | 11/1993 | Rawson, III et al. | 395/700 |
| 5,280,587 | 1/1994 | Shimodaira et al. | 395/275 |
| 5,367,301 | 11/1994 | Stiltner et al. | 341/144 |
| 5,367,646 | 11/1994 | Pardillos et al. | 395/325 |
| 5,371,892 | 12/1994 | Petersen et al. | 395/700 |
| 5,376,928 | 12/1994 | Testin | 340/825.5 |
| 5,379,382 | 1/1995 | Work et al. | 395/275 |
| 5,379,384 | 1/1995 | Solomon | 395/325 |
| 5,386,517 | 1/1995 | Sheth et al. | 395/275 |
| 5,408,618 | 4/1995 | Aho et al. | 395/275 |
| 5,420,987 | 5/1995 | Reid et al. | 395/325 |
| 5,454,081 | 9/1995 | Thome | 395/281 |
| 5,518,851 | 5/1996 | Bender et al. | 395/500 |
| 5,548,782 | 8/1996 | Michael et al. | 395/835 |

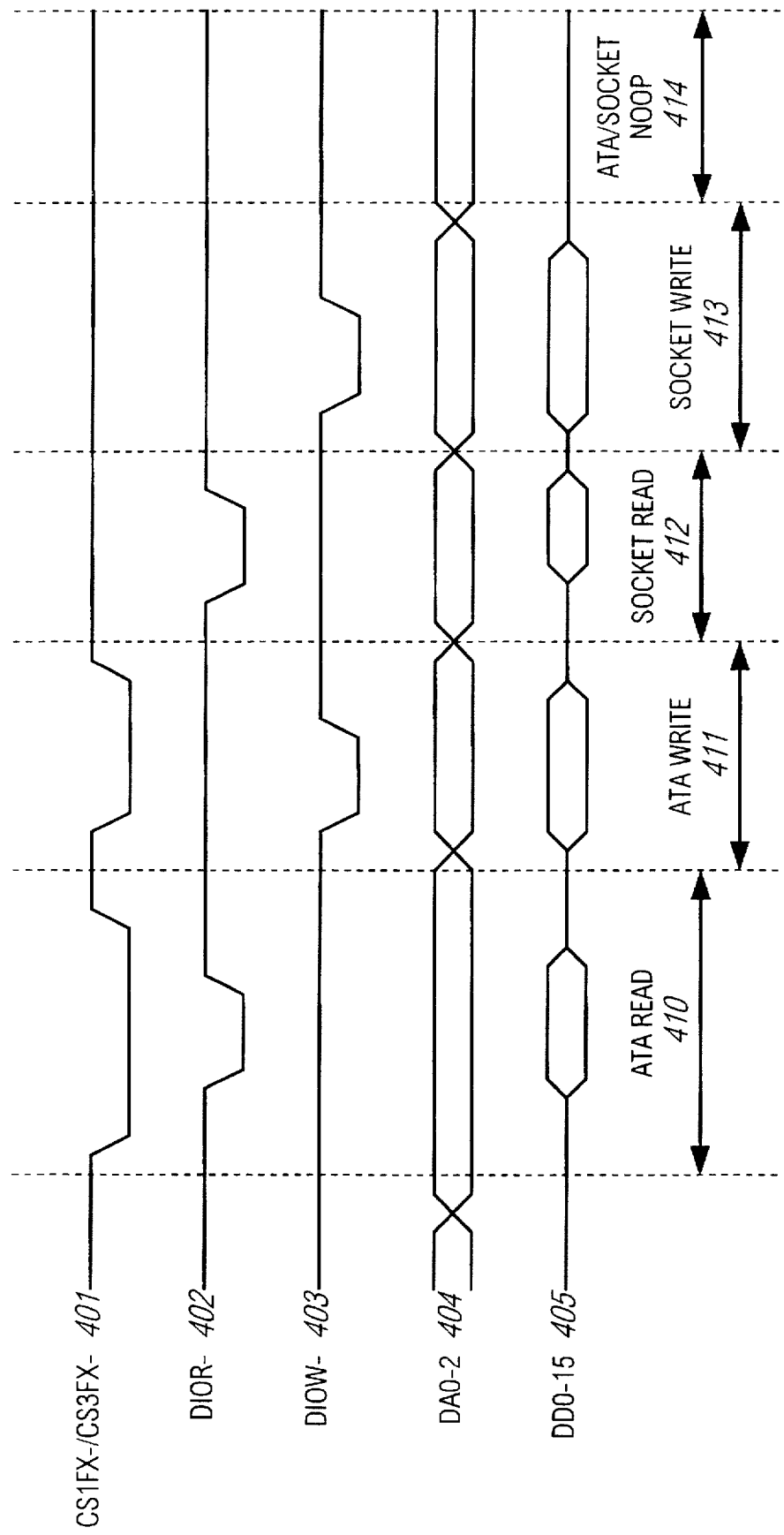

METHOD AND APPARATUS FOR INTERFACING BETWEEN PERIPHERALS OF MULTIPLE FORMATS AND A SINGLE SYSTEM BUS

RELATED APPLICATIONS

This is a continuation of Prior application Ser. No. 08/386,818 filed on Feb. 10, 1995 and now abandoned which, is a continuation-in-part of application Ser. No. 08/266,975 filed on Jun. 27, 1994 now abandoned.

FIELD OF THE INVENTION

The present invention relates to the field of host adapters and interface circuits for interfacing and controlling communications between peripherals and a system bus. More particularly, the present invention relates to the field of host adapters and interface circuits for interfacing and controlling communications between Personal Computer Memory Card International Association (PCMCIA) peripheral cards, infrared peripheral devices, hard disk drives, or other subsystems and a host CPU system bus wherein the PCMCIA peripherals, infrared peripherals, hard disk drives, or other subsystems may have a format and characteristic different from one another.

BACKGROUND OF THE INVENTION

Modern digital systems such as the system 101 illustrated in FIG. 1A typically include multiple integrated circuits on multiple printed circuit boards. The system 101 is a desktop computer which includes two ATA-type disk drives 114 and 115 and two Personal Computer Memory Card International Association (PCMCIA) expansion slots or sockets 116 and 117. PCMCIA is a standard interface and specification to allow PCMCIA cards such as 122 and 123 to vary the capabilities of a computer system or other electronic equipment. The PCMCIA cards consist of a connector that interfaces to a printed circuit board that is approximately the size of a credit card. The main printed circuit board or motherboard 100 includes the central processing unit (CPU) 140, which is the heart of the computer system 101 and controls the operations of the system, and also the internal system memory 142. The CPU 140 is coupled to the system memory 142 and the other integrated circuits on the motherboard 100 by the core logic 143. As peripherals or subsystems such as the disk drives 114 and 115 are added to the system 101, interface boards such as the board 104 are coupled to the motherboard 100 and to the system bus 146. This interface board 104 is also coupled to the disk drives 114 and 115 by a cable 110 which allows the interface board 104 to communicate with the disk drives 114 and 115. The interface board 104 includes the ATA host adapter integrated circuit 108 which serves as the interface and controls communications between the disk drives 114 and 115 and the CPU system bus 146.

In systems of the prior art, as additional peripherals such as the PCMCIA expansion slots or sockets 116 and 117, are added to the system, an additional interface board 102 must be coupled to the motherboard 100 to serve as the interface and control communications between the PCMCIA expansion slots 116 and 117 and the bus 146. The bus 146 has a differing number of address and data lines as compared to the PCMCIA address and data line requirements. Data transfers across bus 146 are at a different rate than the data transfer to a PCMCIA card. Other control signals are also required at the PCMCIA interface in order to adapt to the various needs of differing PCMCIA cards that may be inserted. Thus the PCMCIA interface is very flexible and the PCMCIA adapter 106 is used to interface differing data and address line requirements having different transfer rates between the system bus 146 and PCMCIA cards 122 or 123.

The interface boards 102 and 104 are typically coupled to the motherboard 100 by inserting them into receiving slots on the motherboard 100. Because there is limited space within the computer system case and the number of receiving slots on the motherboard 100 is also typically limited, only a finite number of interface boards can be coupled to the motherboard 100, thus restricting the number of peripherals which can be coupled to the computer system 101 at any one time.

The disk drives 114 and 115 illustrated in FIG. 1A are ATA (Advanced Technology Attached) hard disk drives. ATA hard disk drives may also be commonly referred to as IDE (Integrated Drive Electronics) hard disk drives. ATA is a set of standards and specifications used for communications between disk drives and host central processing units which defines an integrated bus interface between disk drives and host CPUs and provides a common point of attachment for system manufacturers, system integrators and suppliers of intelligent peripherals. The ATA standard interface having 40 total lines, includes a three-bit address bus designated as DA0, DA1, and DA2 used for indexing drive registers; a 16 bit bidirectional data bus designated as DD0 through DD15; a data width format signal designated as IOCS16- indicating either an 8 or 16 data bit capability, a write strobe signal designated as DIOW-; a read strobe signal designated as DIOR-; an interrupt request signal INTRQ, a status signal I/O Channel Ready designated as IORDY, and host chip select 0 and 1 signal lines respectively designated as CS1FX- and CS3FX-. The two host chip select signal lines CS1FX- and CS3FX- which act similar to an address line, select access of either Command Block registers or Control Block registers within an attached ATA disk drive. Other signals present within the ATA standard interface that may be significant to the description of the present invention will be described below. The complete ATA standard interface and communication standard is described within the "Information Technology—AT Attachment Interface for Disk Drives".

The disk drives 114 and 115 may be designated disk drive 0 and disk drive 1 by the ATA cable connection for the ATA standard interface signal CSEL (ground=drive 0, open=drive 1) or by setup switches or jumper wires within the disk drive electronics that are read upon reset. Only one of the disk drives 114 or 115 connected to the same ATA cable 110 can be accessed at any one time. The selection of whether disk drive 0 or disk drive 1 is to be accessed is controlled through use of the drive/head register which is embedded in each disk drive. Both disk drives 114 and 115 simultaneously respond to writes on the cable to the drive/head register, however only the selected drive will respond to writes to other registers therein. Bit 4 of each drive/head register, designated DRV, is used to select the drive that should be active to receive the other drive register accesses and is compared by the drive with its CSEL or switch/jumper configuration as drive 0 or drive 1. If the host CPU sets DRV to zero then drive 0 is selected and further register accesses are to drive 0 registers. If the host CPU sets DRV to one then drive 1 is selected and further register accesses are to drive 1 registers.

Accesses to the disk drives occur during cycles such as those illustrated in FIG. 1D as either ATA read cycles 190 or ATA write cycles 191. Note that during all ATA read or write cycles either a CS1FX- or CS3FX- signal becomes active as illustrated by the CS1FX-/CS3FX- waveform 181. Activation of CS1FX- or CS3FX- is then followed by either DIOR- active low signal or DIOW- active low signal as represented by the DIOR- waveform 182 or the DIOW- waveform 183. If neither CS1FX- nor CS3FX- is active then no write or read operation is being performed to the disk drives regardless of the condition of other signals on the ATA cable 110 including DIOR- and DIOW- as illustrated by the ATA NOOP cycles 192 and 193.

If a read or write host CPU transfer cycle to or from the ATA drive needs to be extended then the ATA drive de-asserts the IORDY signal inactive low. This indicates that the selected hard disk drive needs further time to complete the present operation before any other operation may take place. Otherwise IORDY is pulled up to an active one or an active high level by a pullup resistor.

The PCMCIA expansion slots 116 and 117 illustrated in FIG. 1A are two typical implementations of sockets, also referred to as slots, into which a PCMCIA card 122 or 123 can be inserted. The PCMCIA standard enables memory and I/O devices to be inserted as exchangeable peripherals into electronic devices through a standard interface. A PCMCIA card 122 uses this standard interface, allowing PCMCIA interfaced peripheral devices such as a modem card, a network card, a sound card, a floppy disk drive, a hard disk drive, or other cards to be plugged into the system computer by means of their embodiment in a PCMCIA card 122. This PCMCIA card 122 is plugged into a PCMCIA expansion slot 116 which is coupled to a PCMCIA host adapter integrated circuit 106 within the computer system 101. The operation of the PCMCIA expansion slot 116 is controlled by the PCMCIA host adapter integrated circuit 106. The PCMCIA bi-directional buffer 120 is coupled to the PCMCIA expansion slot 116 through the bus 124. The PCMCIA bi-directional buffer 120 is coupled to the connector 128 by the bus 126. The cable 112 is coupled to the connector 128 and to the connector 130. The connector 130 is coupled to the PCMCIA host adapter integrated circuit 106 by the bus 138.

A second type of PCMCIA expansion slot 117 is also shown in the computer system 101 and coupled to the PCMCIA host adapter board 102. The second PCMCIA expansion Slot 117 is coupled to the termination circuit 121 by the bus 125. The circuits 120 and 121 can be either bi-directional buffers or simple termination circuits. The termination circuit 121 is coupled to the connector 129 by the bus 127. The connector 129 is coupled to the cable 113 which is in turn coupled to the connector 131. The connector 131 is coupled to the PCMCIA host adapter integrated circuit 106 by the bus 139. The first and second PCMCIA expansion slots 116 and 117 are designed to function identically but may provide differing voltage settings and timing parameters.

The ATA standard interface is not compatible with the PCMCIA standard interface in that a PCMCIA device cannot be coupled to a system through an ATA port, even if the differing connector types were not a problem. Correspondingly, a user cannot couple a standard ATA device, such as the disk drives 114 or 115 to a system through a PCMCIA port. However, there is a method of interface described by the ATA SFF (Advanced Technology Adapter Small Form Factor) committee to connect ATA devices packaged in a PCMCIA form factor to PCMCIA socket connectors. This allows an ATA disk drive to be mechanically arranged into a PCMCIA card form factor and designates how the ATA signal lines may be arranged within the card's PCMCIA connector. However, the ATA SFF interface to a PCMCIA socket connector does not support system identification of installed drives and will not work for devices other than ATA SFF packaged disk drives. Due to the limited applicability, the ATA SFF interface method is not supported in many machines which offer PCMCIA card support. For the reasons discussed above, it is preferable to use the more flexible PCMCIA standard because it can interface to a wide variety of peripheral devices including a disk drive interface and because it simplifies the interface.

A second desktop computer system is illustrated in FIG. 1B. The only difference between the system of FIG. 1A and the system illustrated in FIG. 1B is that within the system of FIG. 1B, a single cable 170 is coupled between the PCMCIA host adapter board 102 and the two PCMCIA expansion slots 116 and 117. Cable 170 is a wider cable than cables 112 and 113 of FIG. 1A, carrying a greater number of signal lines to support two PCMCIA expansion slots 116 and 117. Due to the increased number of signal lines, cable 170 and connectors 172 and 133 are more costly than cable 112 or 113 and connectors as illustrated in FIG. 1A. The cable 170 is coupled to the connector 133 and to the connector 172 on the PCMCIA expansion board 178. The connector 133 is coupled to the PCMCIA host adapter 106 by the busses 138 and 139. The connector 172 is coupled to a termination or buffering circuit 176 by the bus 174. The termination or buffering circuit 176 is coupled to the first PCMCIA expansion slot 116 by the bus 124 and to the second PCMCIA expansion slot 117 by the bus 125.

A portable computer system 161 is illustrated in FIG. 1C. The portable computer system 161 includes an ATA compatible disk drive 114, a modem 157 and two PCMCIA expansion slots 116 and 117. Because this is a portable computer system, the integrated circuits such as the ATA host adapter 108 and the PCMCIA host adapter 106 are integrated onto the motherboard 160 instead of coupled through receiving slots as in the desktop system discussed previously. The modem 157 is coupled to a Universal Asynchronous Receiver/Transmitter (UART) through a cable 158 and a bus 155. The UART 154 is also coupled to the system bus 146. The modem 157 is also coupled to a phone jack 156 for coupling the modem to a phone line.

The graphics controller 144 of the portable computer system 161 is coupled to the system bus 146 and to the display used by the portable computer system 161, by either of the outputs 150 or 152. If the display used by the portable system 161 is a CRT display then the RGB output 150 of the graphics controller 144 is coupled to the display. If the display used by the portable system 161 is a flat-panel display then the flat-panel output 152 of the graphics controller 144 is coupled to the display.

While in the systems illustrated in FIGS. 1A, 1B and 1C, ATA compatible peripherals and PCMCIA compatible peripherals have been illustrated and described, peripherals of many different formats can be coupled to systems of the prior art in this same fashion. For example, printers, modems, fax boards, digitizers, scanners and other types of peripherals can be included in a computer system by coupling an expansion board similar to the boards 102 and 104 to the motherboard 100 in desktop systems or integrating additional integrated circuits onto the motherboard 160 for portable computer systems. However, as stated above, the number of peripherals which can be coupled to a computer system at any one time is limited to the amount of space within the computer case and the specific limitations of the motherboard 100. The cost of adding peripherals is also related to the number and size of the chips required to add those peripherals as well as the size and number of cables.

What is needed is an apparatus which allows multiple peripherals of differing formats to be coupled to the motherboard 100 by a single expansion board or a single integrated circuit interface. What is further needed is an apparatus for coupling multiple peripherals to a single expansion board or a single integrated circuit interface using a single cable or connector. What is also needed is an apparatus which will use more efficiently the finite space within a computer system case and allow a greater number of peripherals to be coupled to a computer system. What is needed is an apparatus which will use low cost standard cabling and connectors having a low signal line count in order to provide for the most economically efficient method of supporting an increasing number of peripheral devices within a computer system.

SUMMARY OF THE INVENTION

A peripheral interface system and apparatus including a pair of integrated circuits, referred to as a system adapter and a socket controller, use a communication protocol, referred to as a windowed-interchip-communication (WIC) protocol, to interface peripherals, such as PCMCIA cards or infrared devices, and other subsystems having different formats with a CPU system bus. The system adapter may further communicate to a hard disk drive subsystem using the advanced technology attached (ATA) communication standards to interface an ATA hard disk drive with the CPU system bus. Communication between the system adapter and the socket controller, for purposes of PCMCIA peripheral support and other associated functions within the socket controller such as an IR communications link, is accomplished using the WIC protocol which may share hardware resources with other communication protocols. Communication between the system adapter and the hard disk drive using the ATA protocol and communication between the system adapter and the socket controller using the WIC protocol may be provided on a single chain of a standard 40 pin ribbon cable. The WIC protocol is designed to be able to mutually exist with the ATA protocol over the same interface cable. Alternatively communication between an expansion board and a socket controller may be performed across a cable separate from the hard disk drives having a different signal line format. The system adapter may be included within a single interface expansion board which can be connected to the motherboard and CPU system bus or it can be directly connected or soldered to the motherboard and communicate with the socket controller and ATA hard disk drives again using a single standard 40 pin cable. As another alternative, especially in the case of a portable system, both the system adapter and socket controller may be directly connected or soldered to the motherboard and communicate using a single bus or set of signal traces on a motherboard, or a flexible printed circuit board or other (daughterboard type assembly, which may also be connected to the ATA hard disk drives.

A socket controller integrated circuit can be configured to control one or more PCMCIA slots over a single cable or signal bus interface into which PCMCIA peripherals having different formats may be inserted. A socket controller integrated circuit may be configured to further control one or more infrared peripherals or other subsystem. When communication is desired by a CPU or other controlling device with one of the peripherals coupled to the peripheral interface system, the peripheral interface system first determines which one of the multiple peripherals that are connected to it that the CPU desires to communicate with. The peripheral interface system then converts the signals from the system bus into the proper format for the required peripheral and controls the transmission of those signals to the peripheral. Correspondingly, when a peripheral is sending instructions or data to the CPU or other controller, the peripheral interface system converts the instructions or data from the peripheral into the format required by the CPU or controller and controls the transmission of those signals to the system bus.

In an ISA bus interface implementation of the peripheral interface system, the peripheral interface system monitors the address lines of the system bus in order to determine which peripheral the system is communicating with. The peripheral interface system also monitors the I/O read signal line, the I/O write signal line, the memory read signal line, the memory write signal line of the ISA bus in order to determine the direction and the type of communication that may be originating. In implementations of the peripheral interface systems for other bus systems, similar signals are monitored and the interface and communication protocol may be applied to these systems as well.

When one of the peripherals is initiating a communication with the peripheral interface system, an interrupt signal or direct memory access request is sent to the system adapter integrated circuit. Each of the peripherals coupled to the peripheral interface system has a corresponding detection circuit for detecting when the peripheral interface system is communicating with that peripheral. The chip select signal lines and other address information multiplexed on data signal lines can be used to select each peripheral and notify the peripheral that its operation is required for completion of the current task by the system.

In the case where ATA hard disk drives are connected to the same chain of cable as the system adapter integrated circuit and socket controller integrated circuit, communication between the system adapter integrated circuit and the socket controller integrated circuit is transparent to communication between the system adapter integrated circuit and the ATA hard disk drives.

The peripheral interface system may be adapted to use a communication protocol similar to the windowed-interchip-communication protocol so that other communication busses may share hardware resources such as cables and controller circuits in order to minimize system costs, reduce space requirements, and the component count that is normally associated with providing peripheral expansion capability.

The socket controller integrated circuit also includes status detection logic circuitry for detecting changes in status of selected signals and notifying the system adapter integrated circuit of the changes in status. The detection logic circuitry will capture multiple changes in the status of a selected signal and will transmit those changes in status to the system adapter integrated circuit. The detection logic circuitry ensures that every cycling of a change in status of a selected signal is reported to the system adapter integrated circuit in the order in which the changes occurred.

BRIEF DESCRIPTION OF THE DRAWINGS

FIG. 4 illustrates a waveform diagram showing how additional communication over an ATA bus or cable may be provided by the present invention.

DETAILED DESCRIPTION OF THE PREFERRED EMBODIMENT

Figure 1A:
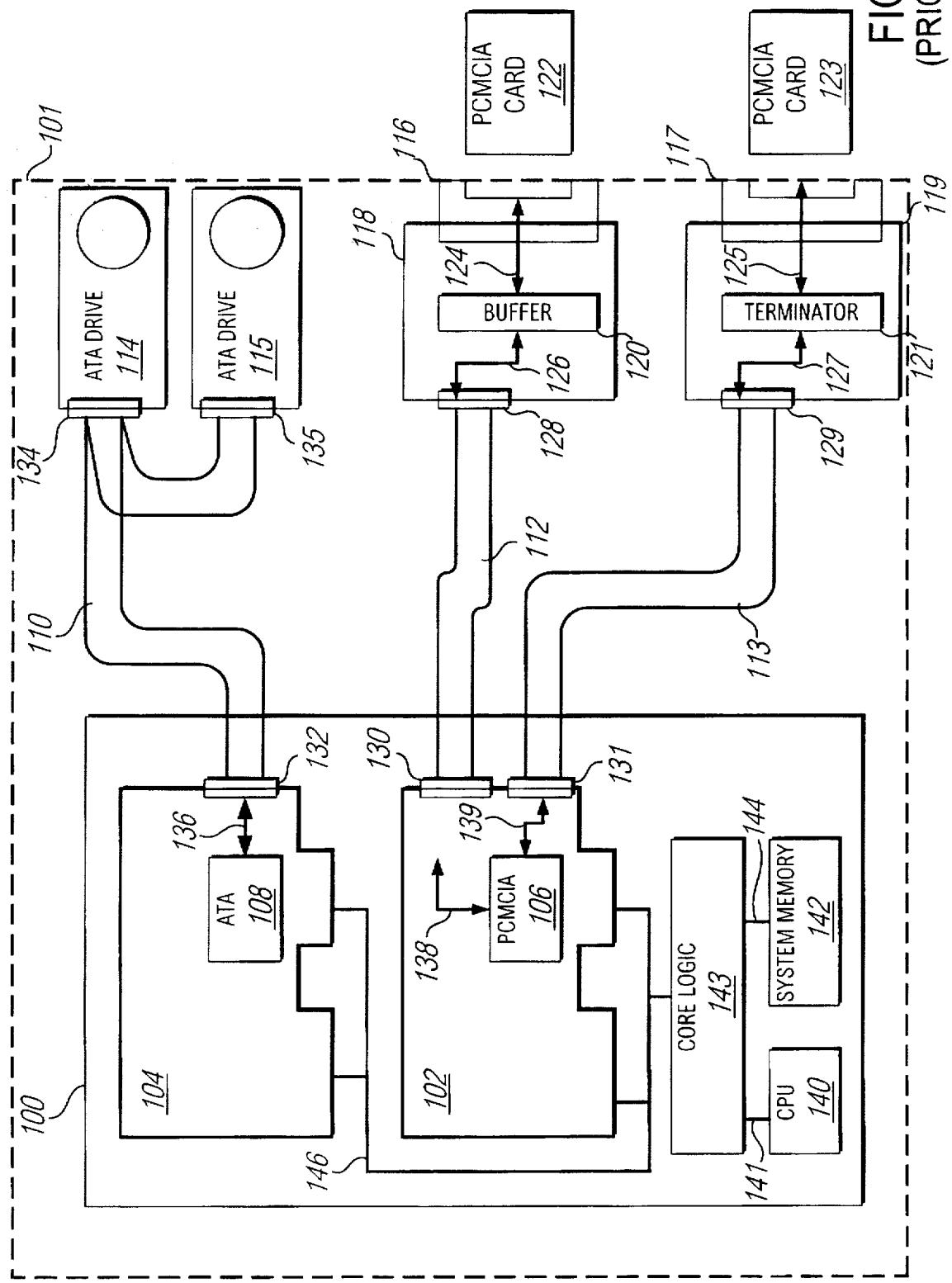
FIG. 1A illustrates a block diagram schematic for a desktop computer system of the prior art, where multiple cables provide the medium for communication between the CPU and various peripherals.
Figure 1B:
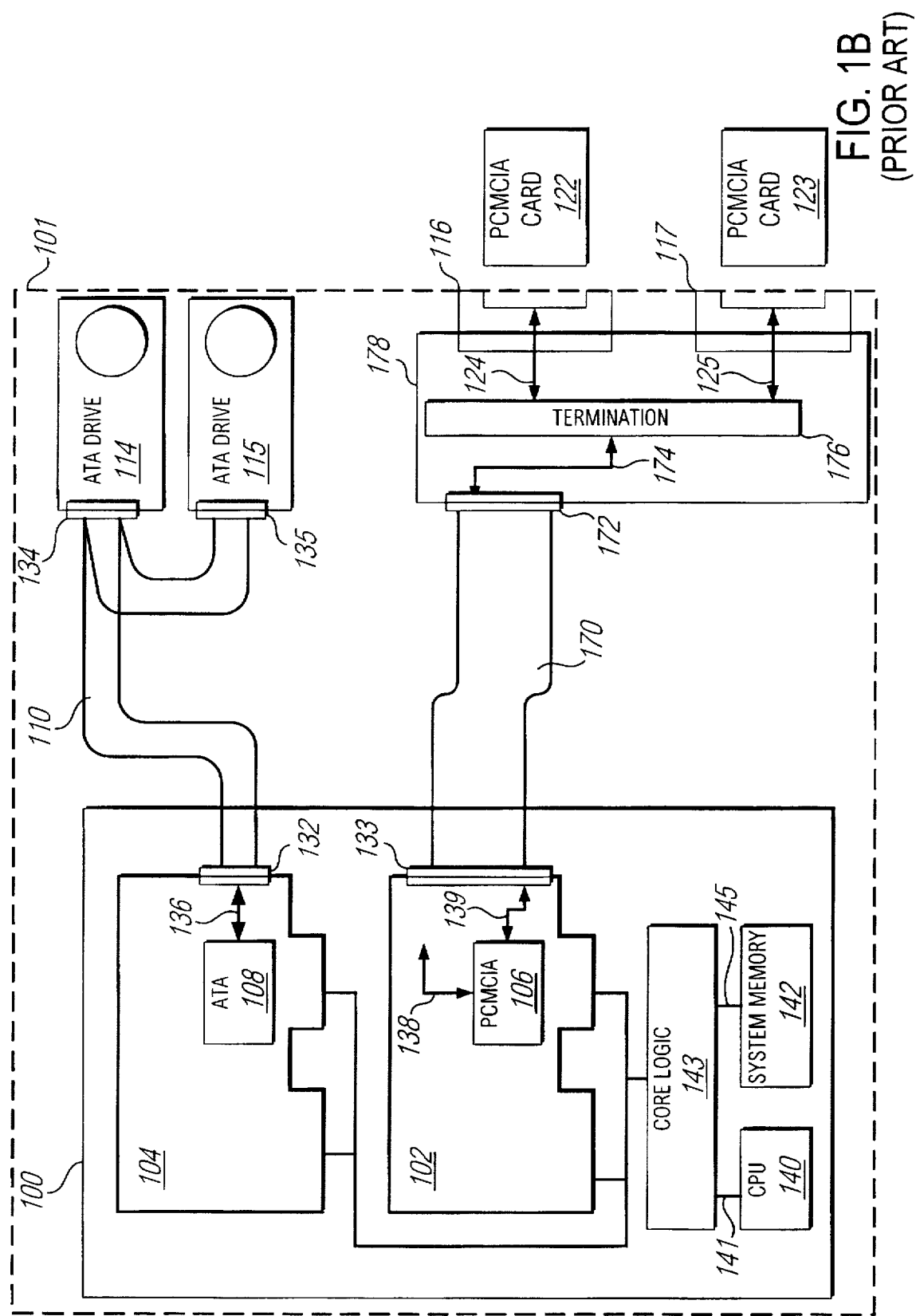
FIG. 1B illustrates a block diagram schematic for a desktop computer system of the prior art where a number of cables as illustrated in FIG. 1A are reduced to a single cable having a large number of signal lines.
Figure 1C:
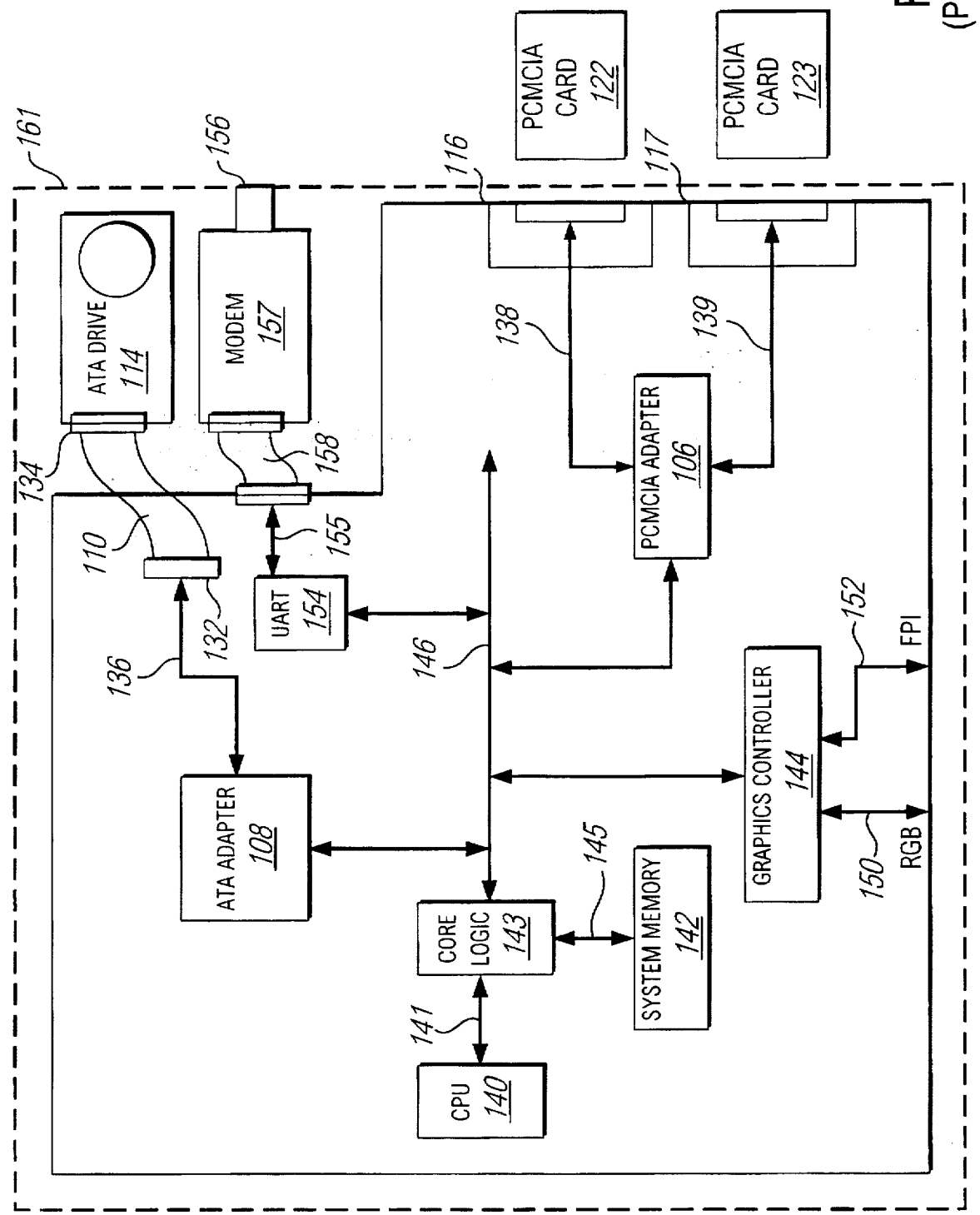
FIG. 1C illustrates a block diagram schematic for a portable computer system of the prior art.
Figure 1D:
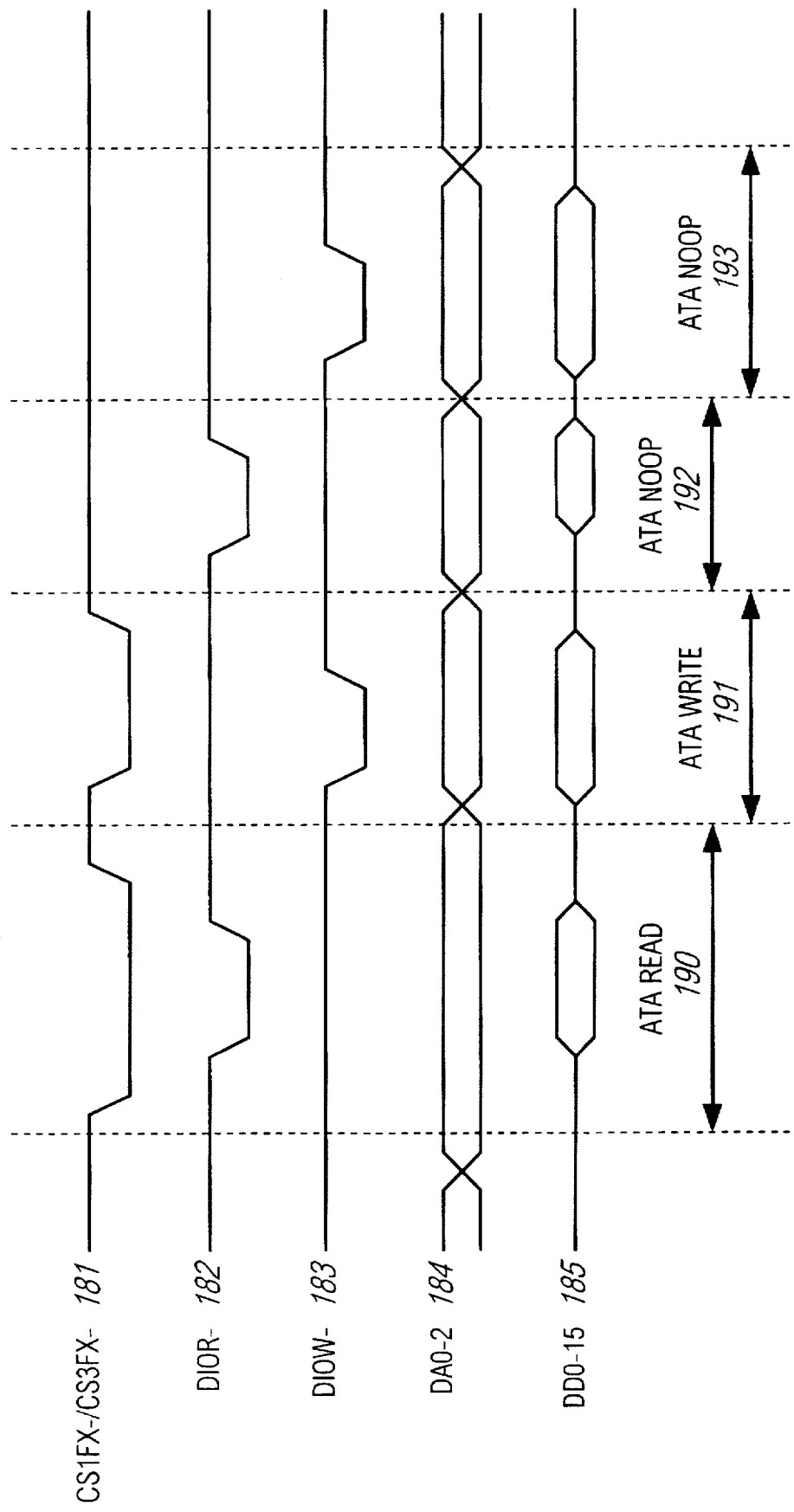
FIG. 1D illustrates a waveform timing diagram showing signal transitions and operating cycles of prior art systems.
Figure 2A:
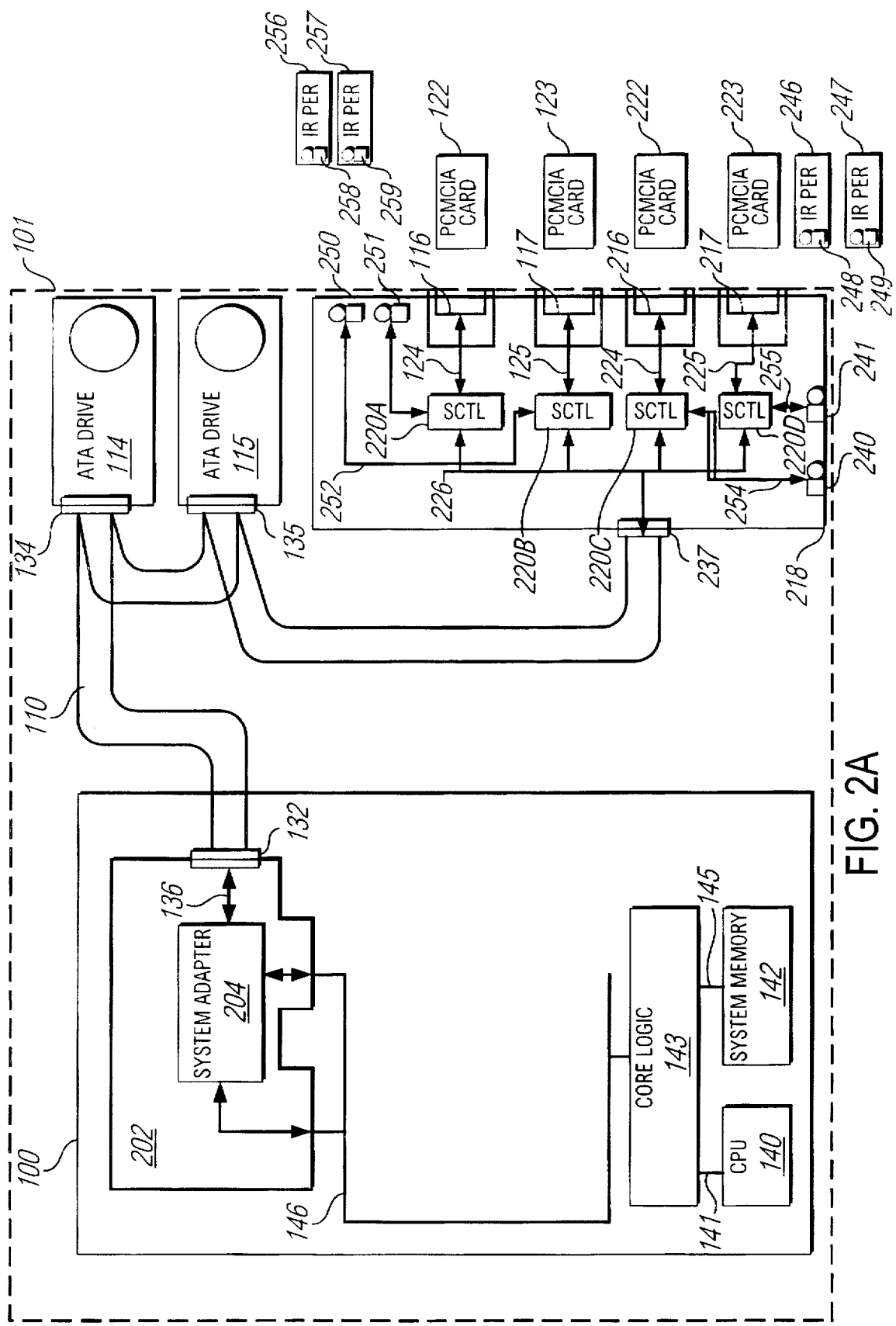
FIGS. 2A and 2B illustrate block diagram schematics for desktop computer systems according to the present invention which include a system adapter integrated circuit and a socket controller integrated circuit.
Figure 2B:
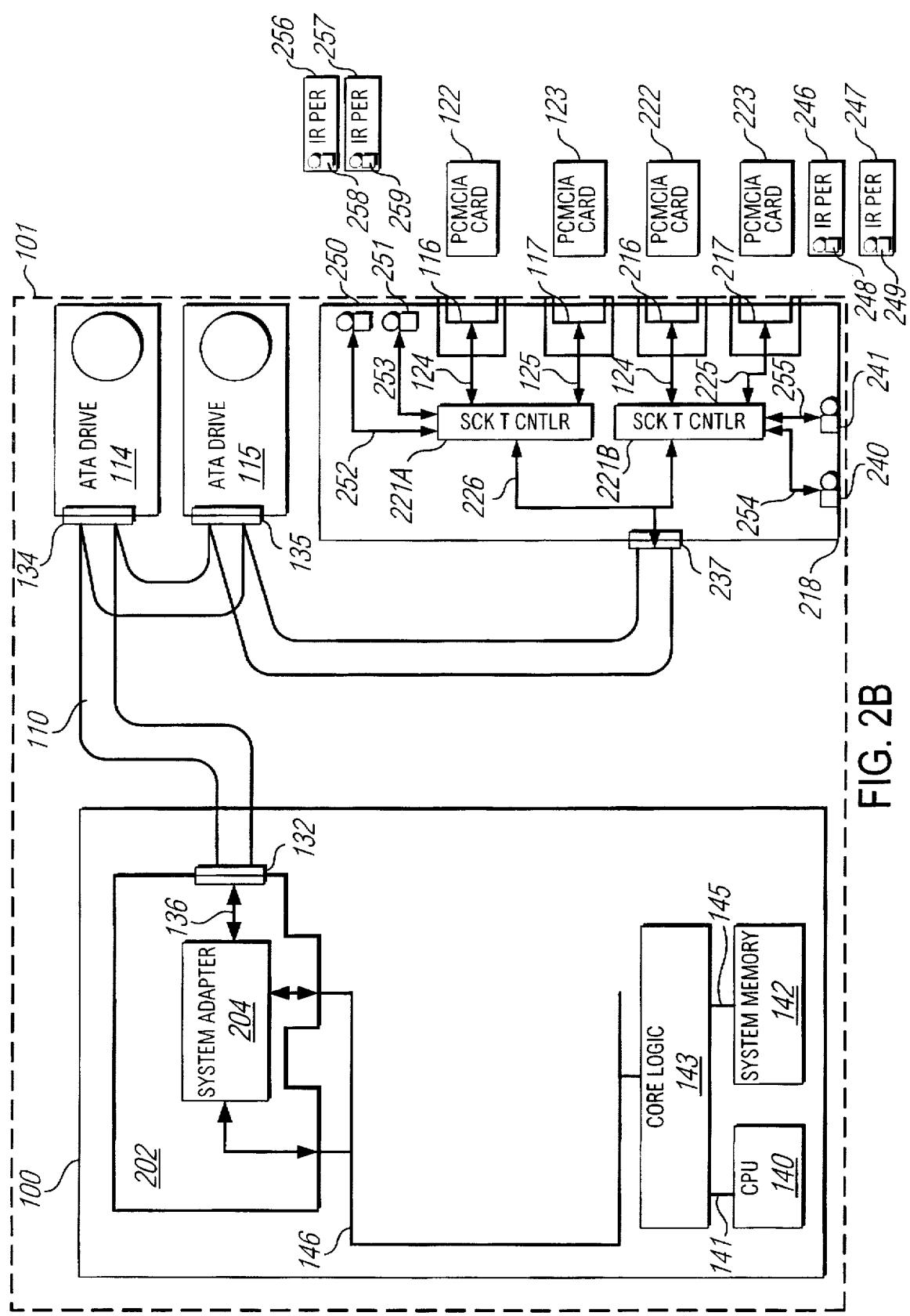

A block diagram schematic for a desktop computer system of the preferred embodiment of the present invention is illustrated in FIGS. 2A and 2B. Infrared peripherals 246, 247,256, and 257 have IR transceivers 248,249,258 and 259 to communicate with the computer using infrared waves. PCMCIA peripheral cards 122,123,222, and 223 may be plugged into the PCMCIA expansion slots or sockets 116, 117,216, or 217 in order to communicate with the computer system. Other subsystems may be similarly connected in order to communicate with the computer. A system adapter interface card 202, including a system adapter integrated circuit 204, is coupled to the motherboard 100. A first ATA disk drive 114 is coupled to the interface card 202 by the cable 110. Cable 110 is preferably an ATA standard 40 signal ribbon cable commonly used to connect ATA disk drives and other subsystems to interface cards or adapter cards. The system adapter integrated circuit 204 is coupled to the connector 132 by the bus 136. The connector 132 is coupled to the connector 134 by the cable 110. The connector 134 is also coupled to the first ATA disk drive 114. The first ATA disk drive 114 and the cable 110 are identical to the disk drive 114 and the cable 110 of FIG. 1. The second ATA disk drive 115 is coupled to the first ATA disk drive 114 by a chain of the cable 110. The cable 110 is coupled to the connector 135 which is coupled to the second disk drive 115. The first and second disk drives 114 and 115 are selected in the same manner as previously described, using the chip select signal lines CS1FX- and CS3FX-.

Figure 9A:
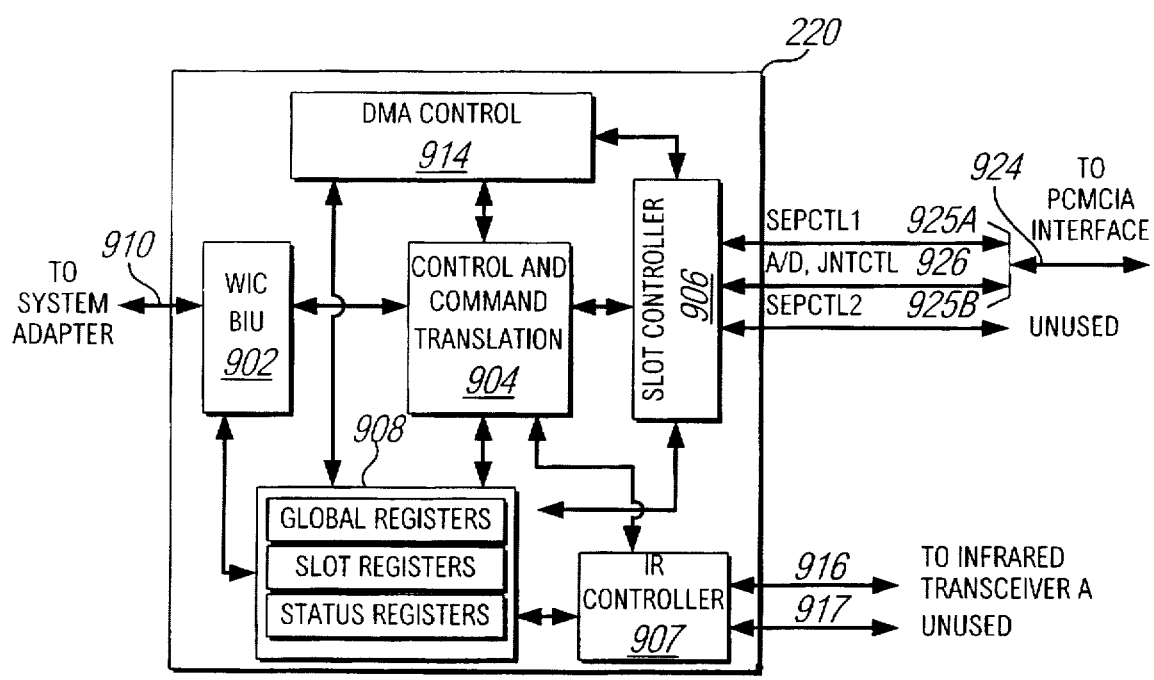
FIG. 9A illustrates a block diagram of a first socket controller of the present invention.
Figure 9B:
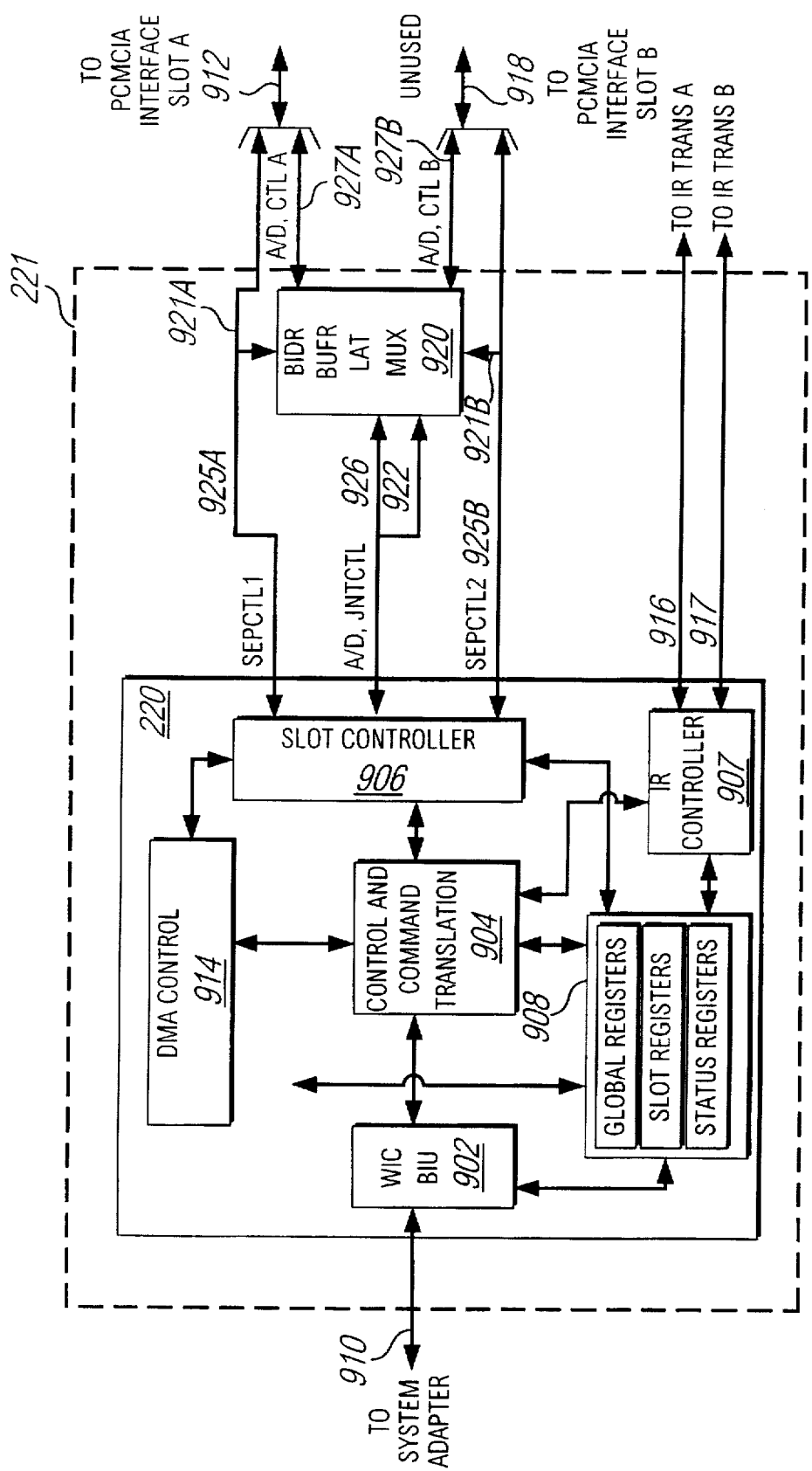
FIG. 9B illustrates a block diagram of a second socket controller of the present invention modified from the first socket controller illustrated in FIG. 9A such that second socket controller supports more than one PCMCIA expansion slot.

The PCMCIA expansion board 218 is also coupled to the second ATA disk drive 115 by a chain of the ATA standard cable 110. The connector 237 is coupled to the PCMCIA expansion board 218 and to the cable 110. In FIG. 2A the socket controllers 220A–D are coupled to the connector 237 by the bus 226, to the first PCMCIA expansion slot 116 by the bus 124, to the second PCMCIA expansion slot 117 by the bus 125, to the third PCMCIA expansion slot 216 by the bus 224, and to the fourth PCMCIA expansion slot 217 by the bus 225. In FIG. 2B the socket controllers 221A and 221B are similarly connected. Socket controllers 221A and 221B include additional circuitry from the socket controllers 220A–D in order that one socket controller 221, as illustrated in FIG. 9B, can support two PCMCIA expansion slots by multiplexing address, data, and common control signals into two slots. FIG. 9B illustrates a block diagram of the socket controller 221, representing socket controllers 221A–B, having an additional circuit 920 adapting the socket controller 220 such that two PCMCIA slot interface busses 912 and 913 may be provided for controlling two slots. FIG. 9A illustrates a block diagram of the socket controller 220, representing the socket controllers 220A–D, that provides support for one PCMCIA slot through the PCMCIA slot interface bus 924. Discussion of the socket controllers 220A–D is generally applicable to the socket controllers 221A–B. The socket controllers 220A–D monitor the signals on the cable 110 in order to determine when a peripheral coupled to the PCMCIA expansion slots 116, 117, 216, and 217 is desired to be accessed by the system adapter integrated circuit 204.

In the preferred embodiment of the present invention access to the PCMCIA expansion slots is somewhat similar as the access to ATA disk drives. Within each socket controller 220A–D there is a register referred to as the index register which all of the socket controllers must modify and monitor whenever it is written. Upon reset and power up a set of multifunction signal lines coupled to each socket controller configure a given socket controller with one or two slot IDs numbered zero through three in order to control one or two slots. For example in FIG. 2A, at reset, socket controller 220A may be initialized to control a single slot 116 having a slot ID number of zero. For example in FIG. 2B, at reset, socket controller 221A may be initialized to control two slots 116 and 117 having slot ID numbers zero and one. The slot ID along with other information is written into the index register of each socket controller to select the actual PCMCIA slot interface 116,117,216, or 217 which will be active. Each socket controller compares the slot IDs that were received upon initialization with the slot ID that was written into the index register. If there is a match then that socket controller having one or more slots will be actively communicating with the system adapter. Thereafter, the PCMCIA slot and socket controller having the matching slot ID written into the index register may respond to slot read and write cycles. Also the socket controller having a matching slot ID will thereafter respond to register read and write cycles into other registers contained with the given socket controller. Further discussion describing the read and write operation between a system adapter and a selected socket controller is described below.

Device and R/W Selection Over ATA Interface

Because the socket controller and the hard disk drive controller of the ATA hard disk drives are connected to the same cable, a socket controller must determine when the PCMCIA slot interfaces are being accessed as opposed to ATA drives. In the preferred embodiment of the invention the ATA signal lines designated CS1FX-, CS3FX-, DIOR-, and DIOW- which are active low signals may be used. Prior art systems having an ATA interface retransmit nearly all of the signals of the ATA interface directly to or from the host CPU system bus (ISA). In prior art systems CS1FX- and CS3FX- are generated by a Programmable Array Logic (PAL) circuit or other similar circuitry when the unique addresses for ATA interfaces are decoded. In prior art systems IOW- and IOR- signals from the ISA bus are only qualified by address enable, designated as AEN, to respectively generate DIOW- and DIOR-. This causes DIOR- and DIOW- to constantly change state for keyboard, modem, UART, PIA, or other system read and write operations that are not accessing the ATA drives. Thus ATA drives are designed to not respond to a DIOR- or DIOW- active low transition unless a CS1FX- or CS3FX- line is active. In the ATA protocol this condition or cycle, illustrated as ATA NOOP cycles 192 and 193 in FIG. 1D, falls within conditions which ATA disk drives must treat as being undefined and, is to be ignored. In the present invention it is desirable to use these ATA NOOP conditions or cycles as accesses to other peripheral devices as illustrated by the SOCKET READ 412 and SOCKET WRITE 413 cycles of FIG. 4. The system adapter 204 further qualifies accesses to the ATA hard disk drives and the socket controller such that unwanted transitions in DIOR- and DIOW- such as those illustrated in cycles 192 and 193 of FIG. 1D are not present.

In the preferred embodiment of the present invention the system adapter 204 interfaces the host CPU bus to the ATA drives 114 and 115 and the socket controllers 220A–D, such that more control can be taken of the DIOR- and DIOW- lines. Therefore, the DIOR- and DIOW- lines can be used for additional device selection in conjunction with the CS1FX- and CS3FX- lines. In the present invention the generation of DIOR- and DIOW- signals by the system adapter are different from prior art systems. The generation of these signals are further qualified by addresses on the system bus such that DIOR- and DIOW- only change state when an ATA READ cycle 410, ATA WRITE cycle 411, SOCKET READ cycle 412, or SOCKET WRITE cycle 413 occurs having the appropriate address on the system bus to access either the ATA drive or other peripheral device such as a PCMCIA slot or other subsystem. If the appropriate ATA drive address or peripheral device address is not present DIOR-, DIOW-, CS1FX-, and CS3FX- signals are not generated by the socket adapter as indicated by the ATA/SOCKET NOOP cycle 414 in FIG. 4. Table 1 below indicates the active signal logic levels for cycles of operations that occur across the interface of the present invention. DIOR- and DIOW- signals indicate when a read or write operation on the cable will actually occur. For a selected ATA drive, read and write operations into command block registers or control block registers may occur as indicated by Table 1. The read and write cycles for a socket as shown in Table 1 are further discussed below with reference to FIGS. 7A–G.

TABLE 1

| CS1FX- | CS3FX- | DIOR- | DIOW- | Description |
|---|---|---|---|---|
| 0 | 1 | 0 | 1 | Rd CMD Blk Reg. from sel. ATA drive |
| 1 | 0 | 0 | 1 | Rd CNTL Blk Reg. from sel. ATA drive |
| 0 | 1 | 1 | 0 | Wt CMD Blk Reg. from sel. ATA drive |
| 1 | 0 | 1 | 0 | Wt CNTL Blk Reg. from sel. ATA drive |
| 1 | 1 | 0 | 1 | Read from other peripheral device |
| 1 | 1 | 1 | 0 | Write to other peripheral device |
| 1 | 1 | 1 | 1 | no op.for ATA or other per. device |

Referring to FIG. 4, four types of command cycles are shown whereby the system adapter may communicate with either of two selected ATA drives or any one of a plurality of socket controllers on cable 110. In the first cycle 410 a read operation is performed to the ATA drive. The active ATA drive 114 or 115 would have been determined by a prior write to the device ID register as previously explained. Note that one but not both CS1FX- or CS3FX- signals represented by the CS1FX-/CS3FX- waveform 401 is active low during this cycle and DIOR- 402 goes active low. ATA WRITE cycle 411 shows a write operation being performed to one of the ATA drives where either CS1FX- or CS3FX- but not both are active and DIOW- 403 is active low.

The next cycle is a SOCKET READ cycle 412 where both CS1FX- and CS3FX- represented by the waveform CS1FX-/CS3FX- 401 are inactive. The inactivity in signals CS1FX- and CS3FX- and an active transition in the signal DIOR- can be decoded by the socket controller 220 as a read operation for the socket controller and other peripheral devices connected to the socket controller. Since DIOR- 402 and DIOW- 403 are controlled by the system adapter so as to go active only during actual cycles to either hard disk drives or the socket controller and its associated peripherals, the socket controller 220 can observe the CS1FX- and CS3FX- 401 lines along with the DIOR- 402 and DIOW- 403 lines to unambiguously recognize whether cycles are intended for it or not.

The SOCKET WRITE cycle 413 indicates a write command cycle for a peripheral device such as a PCMCIA slot interface where both signals CS1FX- and CS3FX- are inactive in a high state represented by the waveform CS1FX-/CS3FX- 401.

Registers within the system adapter may be programmed to translate specific system read and write operations into corresponding patterns of SOCKET READ 412 and SOCKET WRITE 413 cycles to the intended socket controller. Each socket controller is configured with a separate device ID or socket IDs by hardware configuration pins or other known methods to facilitate its unique addressing by the system adapter.

Interrupts and Service Requests Across the ATA Interface

Since there is only one interrupt signal line INTRQ available on an ATA cable such as cable 110 and hard disk drives within the prior art use this line at unpredictable times. INTRQ is preferably not used in the present invention for other peripheral interrupt signalling. It is preferred that a different signal within the ATA cable, unused during periods when the chip select signals CS1FX-/CS3FX- are inactive, be selected as an interrupt signal line for the present invention. The preferred signal to indicate a service request for the present invention is the host 16 bit I/O signal IOCS16-. ATA hard disk drives in the prior art use the signal IOCS16- to indicate to the system that the current transfer is to be completed using a word having a 16 bit data width. ATA hard disk drives only assert IOCS16- during system transfers of data when either CS1FX- and CS3FX- are active. IOCS16- is not asserted by ATA hard disk drives when CS1FX- and CS3FX- are inactive. Thus IOCS16- can be used by the socket controller 220 to communicate a service request to the system adapter 204 during periods when CS1FX- and CS3FX- are inactive. The system adapter 204 recognizes interrupts or service requests and once such a signal has been received the system adapter will query the other peripherals on cable 110 by performing a broadcast read of all other peripherals. Each of these peripherals will be assigned a bit based on their uniquely configured device ID to return if they are in fact generating the interrupt, service request, or DMA request. Once the type of service and what socket controller or associated peripheral has requested service is determined, the system adapter 204 can then return the appropriate information to the system bus 146 such that the host CPU can process and respond to the service request.

Window-Interchip-Communication Protocol

The system adapter 204 is also coupled to the system bus 146 in order to monitor and control any communication which the CPU 140 is required to have with any of the peripherals or subsystems which are coupled to the interface card 202. When an address appears on the system bus 146 which is in the range of addresses used to access any of the peripherals or subsystems coupled to the interface card 202, the system adapter 204 determines whether it is an ATA drive 114,115, PCMCIA Card 122,123,222,223, IR (infrared) peripheral 246,247,256,257, or other peripheral or subsystem that the host CPU desires to communicate with. The system adapter 204 then activates the appropriate ATA drive 0 or 1, socket controller 220 or other peripheral or subsystem. Because the socket controller 220 controls a plurality of PCMCIA Card peripherals 122,123,222,223 and IR peripherals 246,247,256,257 over the limited signal lines specified by the ATA specification and contained within the standard ATA cable, a new protocol is required for the system adapter 204 and the socket controllers 220A-D to communicate to one another. Amongst other things, the system adapter 204 bidirectionally translates the signals from the system bus 146 into ATA command signals designated by the ATA specification for the ATA disk drives 114,115 or the system adapter 204 bidirectionally translates the signals from the system bus 146 into a windowed-interchip-communication (WIC) protocol for communication to the socket controllers 220A-D. Amongst other things, the socket controllers 220A-D bidirectionally perform translation of WIC protocol signals into PCMCIA protocol signals of the PCMCIA standard for the PCMCIA peripherals coupled through the PCMCIA expansion slots 116, 117, 216, and 217. Additionally the socket controllers 220A-D bidirectionally translate the WIC protocol signals into a plurality of serial inputs and serial outputs in order to communicate to IR peripherals 246,247,256,257. The WIC protocol is used by the system adapter 204 and socket controllers 220A-D as well as socket controllers 221A-B. Other peripherals or subsystems may use the WIC protocol with slight modification which should be obvious to one of ordinary skill in the art. The WIC protocol uses the inactivity of CS1FX- and CS3FX- signals to perform a series of SOCKET READ 412 or SOCKET WRITE 413 cycles using DIOR- 402 and DIOW- 403 without causing an access of an ATA disk drive as discussed above with reference to FIG. 4.

As previously mentioned the WIC protocol is used because of the limited signal count within an ATA standard cable, the plurality of PCMCIA or IR peripherals, and the differing control and address requirements between the PCMCIA standard [26 Address bits (A0–25); 16 Data bits (D0–15)] and the ATA standard [3 Address bits (DA0–2); 16 Data bits (DD0–15)]. To accommodate these differences a combination of more than one SOCKET READ or SOCKET WRITE cycle as illustrated in FIG. 4 may be used to implement an operation using the WIC protocol. FIGS. 7A–7G illustrate waveform timing diagrams for the communication operations that are performed using the WIC protocol. The WIC protocol utilizes a minimum number of signals from those available within an ATA standard cable in order to minimize the use of pins and achieve a low cost socket controller and system adapter. Operations performed using the WIC protocol include long or short slot read or write, register read or write, DMA read or write, and service request. In each of FIGS. 7A–7G the signals CS1FX- and CS3FX- are held high as illustrated by waveform 401 in FIG. 4 during the SOCKET READ 412 or SOCKET WRITE 413 cycles and is assumed to be the case in the discussion of these figures below.

Figure 7A:
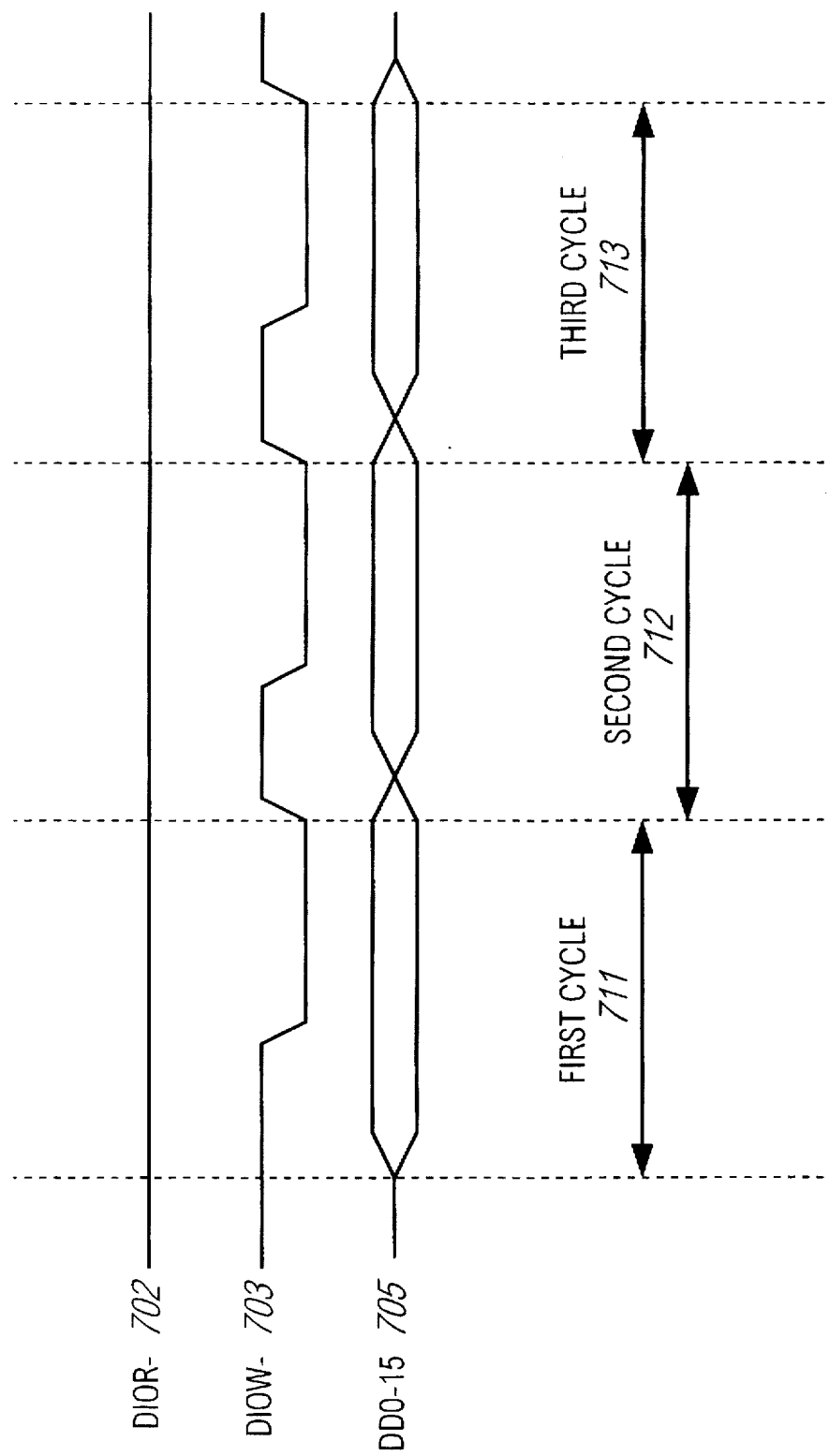
FIGS. 7A–G illustrate waveform diagrams of the various operations that may be performed over a standard ATA cable using the WIC (windowed-interchip-communication) protocol of the present invention.

FIG. 7A illustrates a timing diagram for a long slot write operation. Table 2 below provides the operational cycle for a long slot write or read operation.

TABLE 2

| DD bit # | 15 14 13 | 12 11 | 10 | 9 8 | 7 6 5 4 3 2 1 0 |
|---|---|---|---|---|---|
| Cycle 1 | window # | socket # | Short | | address9-0 |
| Cycle 2 | | | address25-10 | | |
| Cycle 3 | | 16 bit word or single byte of slot data | | | | the first cycle 711 for the long slot write operation the PCMCIA window number is provided on data lines (DD13–15), the PCMCIA socket number, also referred to as slot number, indicating which slot or socket is to be communicated with is provided on data lines (DD11–12), the short bit value (set to zero) indicating a short slot operation if a logical one and a long slot operation if a logical zero is provided on data line (DD10), and the 10 least significant address bits (A0–9) of the PCMCIA window address are provided on data lines (DD0–9). In the case that a transfer is directed to a register or other operation within a socket controller and not a register, memory, or other operation within a PCMCIA peripheral card, the PCMCIA window number is set to 7 hexadecimal (111 binary) which is a special window number having a value greater than the highest window number that is presently available in the system adapter for interface with a PCMCIA peripheral card. The window number 7 hexadecimal can also indicate that a non-card-memory type or I/O access type of WIC operation is to be performed such as a register access, card DMA read or write or service request operation. The system adapter provides these values onto the 16 data lines (DD0–15) of the ATA adapter during the first cycle 711 and strobes the DIOW- 703 keeping CS1FX- and CS3FX- signals inactive high such that the socket controller captures this information off the cable starting on the negative edge of the DIOW-strobe. The PCMCIA window number (DD13-15) indicates the number corresponding to windowed areas of address space that the host CPU attempts to access a PCMCIA card. The PCMCIA socket number (DD11-12) indicates which slot 116, 117, 216, or 217 that the host CPU is to communicate with. The use of the window number and socket number within the WIC protocol are designed to limit the amount of information that is to be transferred between the system adapter and socket controller to access a PCMCIA peripheral. The short bit value (DD10) indicates whether or not the slot read or slot write operation is a long or short slot read or write. If the operation is a short slot read or write then the upper address bits remain the same as that which were previously used and only the lower order address bits need be provided. In most transfers of data, rarely do the most significant bits of address change. The 10 least significant address bits (A0-9) on the data lines (DD0-9) indicate the lower order address pointing to the desired PCMCIA window address space for the PCMCIA peripheral. The strobe of DIOW- 703 within a first cycle of the WIC protocol further indicates that a write operation is being performed to the socket controller, PCMCIA peripheral, or IR peripheral. If DIOR- were strobed within a first cycle of the WIC protocol then this would indicate that a read operation is being performed from the socket controller, PCMCIA peripheral, or IR peripheral. If DIOR- were strobed within a first cycle of the WIC protocol then the negative edge of the DIOR- strobe allows the socket controller to capture the address information placed on the data lines (DD0-15) of the ATA interface. Note that even though DIOR- is activated data may still flow from the system adapter to the socket controller.

In the second cycle 712 of the long slot write operation, the 16 most significant bits (A10-25) of the PCMCIA window address are provided onto the data lines (DD0-15) of the ATA interface. In a short slot write or short slot read operation the second cycle of the long slot write operation providing the MSBs for the PCMCIA window address are not needed and thus the data transfer operation for a short slot write or read operation would occur during the second cycle. In the third cycle of the long slot write operation a two byte word of 16 bits or a single byte of 8 bits of data are provided onto the 16 data lines (DD0-15) of the ATA cable. The two byte word transfer consisting of 16 bits of data is indicated by the IORDY signal during the first cycle of the long or short slot read or write operation or a DMA read or write operation. In the case of these operations of the WIC protocol if IORDY is inactive low at the negative edge of either the DIOW- or DIOR- strobe then the data transfer is a two byte word of 16 bits. If IORDY remains in the active high state by being pulled up by a passive resistor pullup, then upon the negative edge of DIOW- or DIOR- the data transfer is a single byte of 8 bits. In either case whether 16 or 8 bits of data transfer is indicated, the system adapter ceases to drive the IORDY signal which may then be asserted by the socket controller after a small delay. After this data width transfer indication, the IORDY signal may be asserted by a socket controller to indicate control of the bus. The socket controller can continue to drive IORDY low and extend the duty cycle beyond the minimum in order to complete an operation using more time. The first cycle in each operation has a fixed minimum pulse width and duty cycle but can be extended by IORDY if necessary. After the socket controller has completed the operation and communication desired by the system adapter within the given cycle, the socket controller stops driving IORDY low and allows it to be pulled into its high state by a pullup resistor. Once the system adapter detects that IORDY has reached its high state, it drives DIOW- or DIOR-, whichever was asserted active low, into its inactive high state and prepares for a next cycle. In this manner the socket controller can keep IORDY at a low voltage level which extends the duty cycle until it has completed the operation and any associated communication.

Figure 7B:
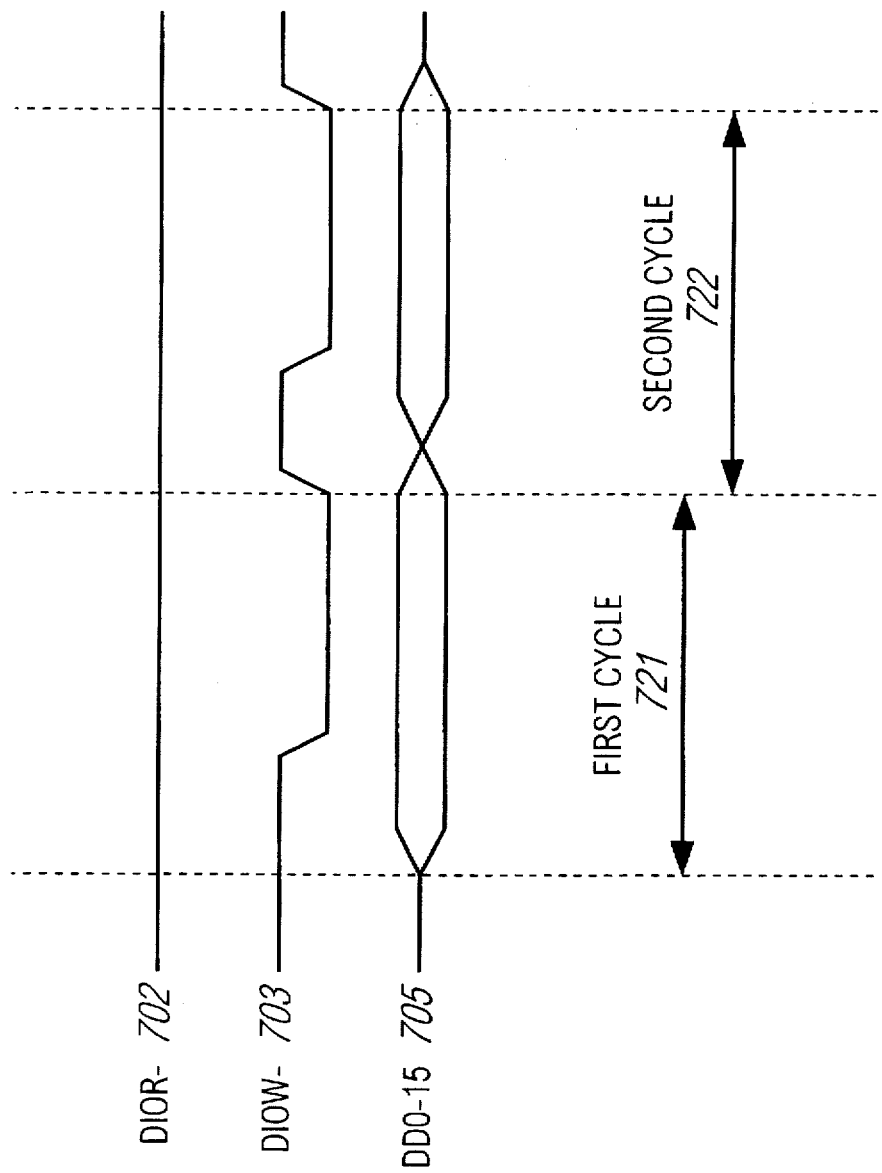

FIG. 7B illustrates a timing diagram for the short slot write operation. Table 3 below illustrates the operational cycles for a short slot write or read operation.

TABLE 3

| DD bit # | 15 14 13 | 12 11 | 10 | 9 8 | 7 6 5 4 3 2 1 0 |
|---|---|---|---|---|---|
| Cycle 1 | window # | socket # | Short | | address9-0 |
| Cycle 2 | | 16 bit word or single byte of slot data | | | |

Similar to the long slot write operation, the system adapter provides within the first cycle the PCMCIA window number, PCMCIA socket number, short bit value (set to one), and the 10 least significant address bits (A0-9) of the PCMCIA window address onto the 16 data lines (DD0-15) of the ATA interface and cable. In the second cycle a 16 bit word or single 8 bit byte of data is provided onto the data lines (DD0-15) of the ATA interface by the system adapter as was previously discussed in the explanation of the third cycle of the long slot write operation.

Figure 7C:
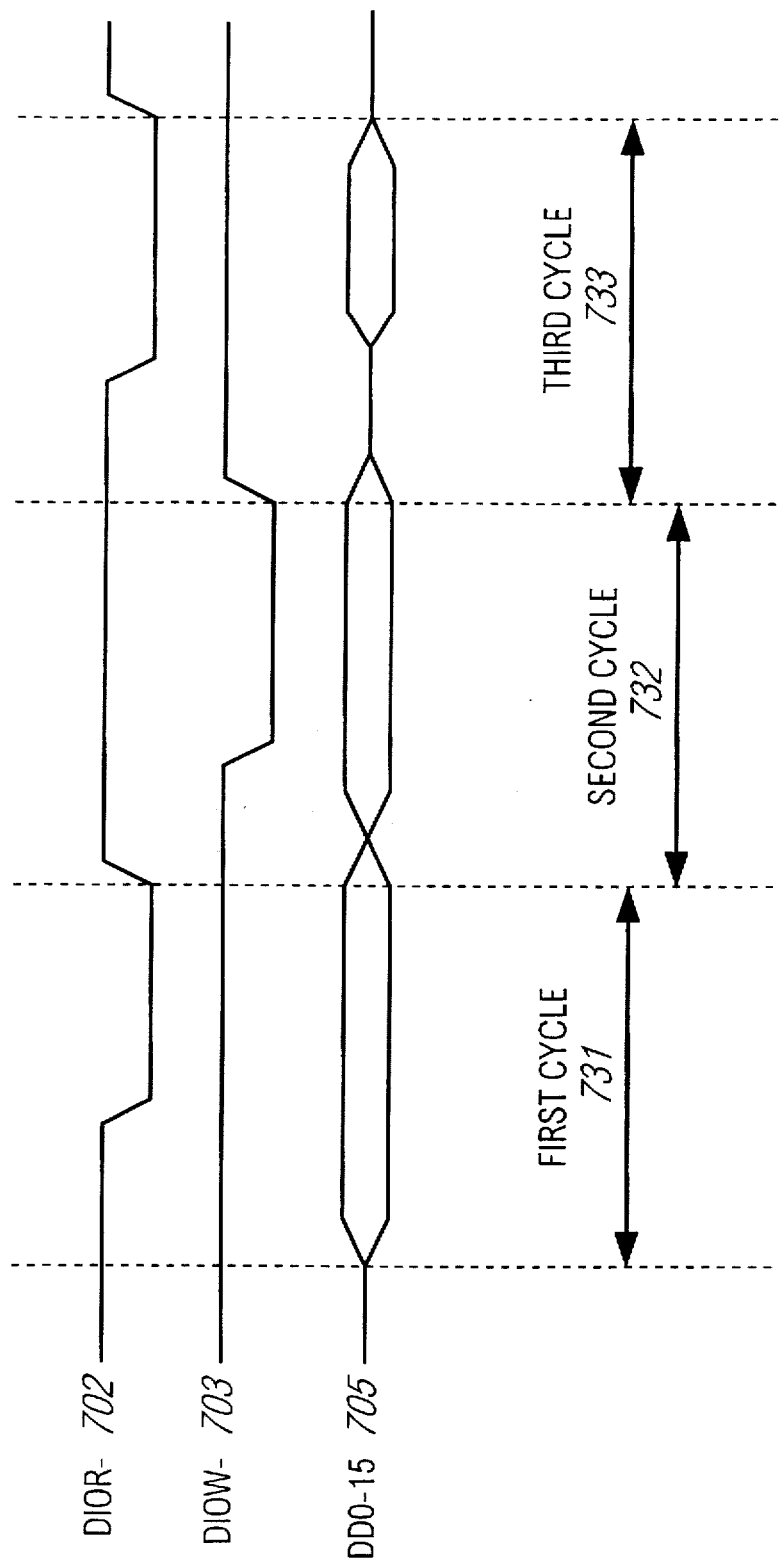

FIG. 7C illustrates a timing diagram for a long slot read operation. Table 2 above illustrates the operational cycles for a long slot read operation. As discussed above during the first cycle of the long slot write operation, the system adapter provides the PCMCIA window number, PCMCIA socket number, short bit value (set to zero), and the 10 least significant address bits (A0-9) of the PCMCIA window address onto the data lines (DD0-15) of the ATA interface. DIOR- is strobed active low indicating that a read operation is to be performed from the PCMCIA to the host CPU. Note that even though DIOR- is asserted, data may flow from the system adapter to the socket controller. The negative edge of the DIOR- strobe allows the socket controller to capture the address information placed on the data lines (DD0-15) of the ATA interface. In the second cycle for a long slot read operation the 16 most significant bits (A10-25) of the PCMCIA window address are provided onto the data lines (DD0-15) of the ATA interface by the system adapter. DIOW- is used during the second cycle to strobe the 16 MSBs of address information into the socket controller. Once this address is received by the socket controller it can start accessing data from the PCMCIA slot/card in preparation for the next cycle. In the third cycle the system adapter provides an additional DIOR- strobe so that the socket adapter can drive the data lines (DD0-15) with the data associated with the desired PCMCIA window address.

Figure 7D:
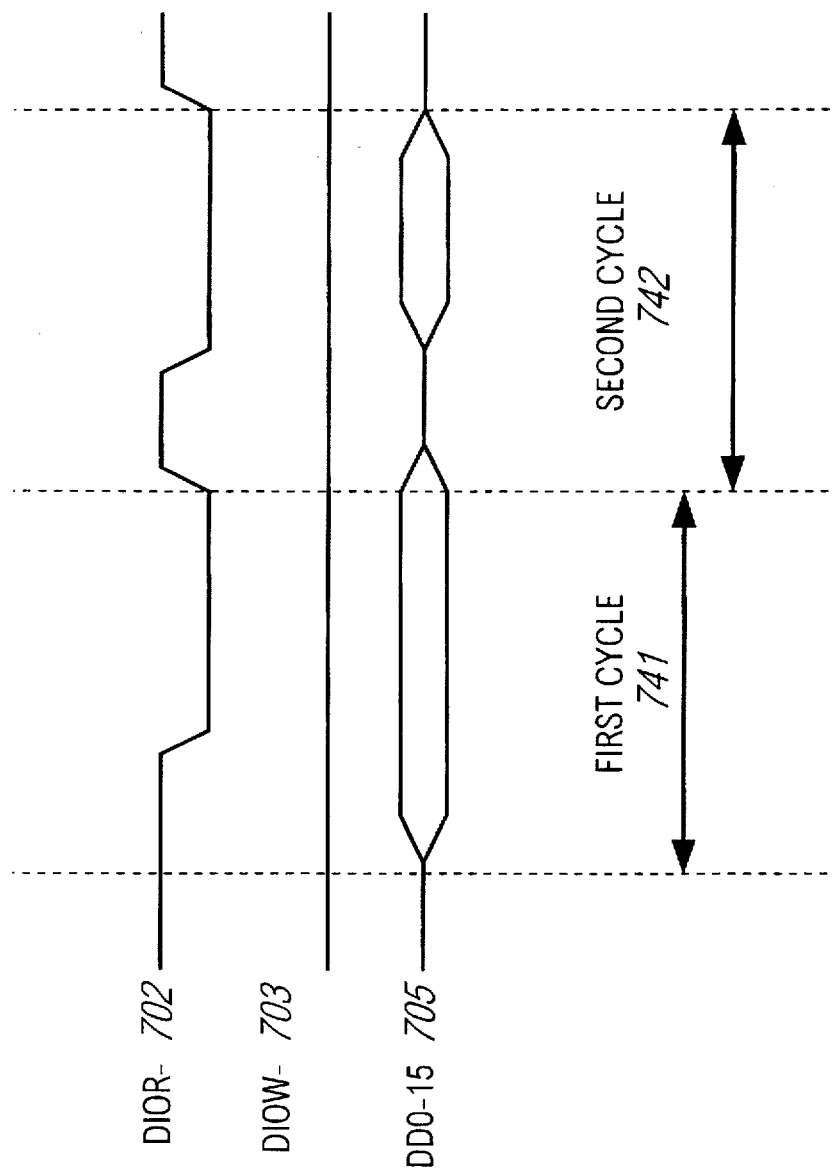

FIG. 7D illustrates a timing diagram for a short slot read operation. Table 3 above illustrates the operational cycles for a short slot read operation. Similar to the first cycle 731 of the long slot read operation, the system adapter 204 provides within the first cycle 741 the PCMCIA window number, PCMCIA socket number, short bit value (set to one), and the 10 least significant address bits (A0-9) of the PCMCIA window address onto the 16 data lines (DD0-15) 705 of the ATA interface and cable. The short bit value being set to one indicates a short slot read operation where the 16 most significant address bits (A10-A25) of the PCMCIA window address is the same as the 16 most significant address bits of the previous access. Thus the second cycle 732 associated with the long slot read operation of FIG. 7C is not needed. In the second cycle 742 a 16 bit word or single 8 bit byte of data is provided onto the data lines (DD0–15) 705 of the ATA interface by the system adapter as was discussed above in the third cycle 733 of the long slot read operation.

DMA read and write operations for I/O type peripherals where there is no associated PCMCIA window memory address, slightly modify the short slot read and write operations of the WIC protocol that are illustrated by FIGS. 7B and 7D. Table 4 below illustrates the cycles that are performed for a DMA read and write operation.

TABLE 4

| DD bit # | 15 | 14 | 13 | 12 11 | 10 | 9 8 7 6 5 4 3 2 1 0 |
|---|---|---|---|---|---|---|
| Cycle 1 | 1 | 1 | 1 | socket# | TC | 1 0 0 0 0 0 0 0 0 0 |
| Cycle 2 | | | | 16 bit word or single byte of slot data | | |

Examples of I/O type peripherals that may use the DMA operations are hard disk drives, silicon disk drives, floppy disk drives, sound cards, and fax/data modems. Examples of memory type peripherals which may not support DMA operations and require standard methods of addressing are flash memory PCMCIA cards, static RAM PCMCIA cards, and DRAM PCMCIA cards. During the first cycle a DMA op code where Bits 8 and 9 (DD8–9) are set to zero and one respectively are provided which designate the cycle as a DMA access while bits 13–15 are all set to logical ones or 7 hexadecimal representing the special window number. During the first cycle for a DMA read or write operation the lower order address bits (A0–9) are unused and thus bits 0–7 (DD0–7) are set to zero. Bit 10 (DD10) that represents the terminal count bit is set to a logical one value when the system adapter wishes to pass a DMA terminal count condition to the PCMCIA peripheral. The socket or slot number being accessed is represented by bits 11 and 12 (DD11–12). If during the first cycle of the DMA operation the signal IORDY is asserted to a logical low then the DMA transfer is a 16 bit word DMA access. During the second cycle for a DMA read or write operation the data is actually transferred by respectively using a DIOR- or DIOW- strobe.

Figure 7F:
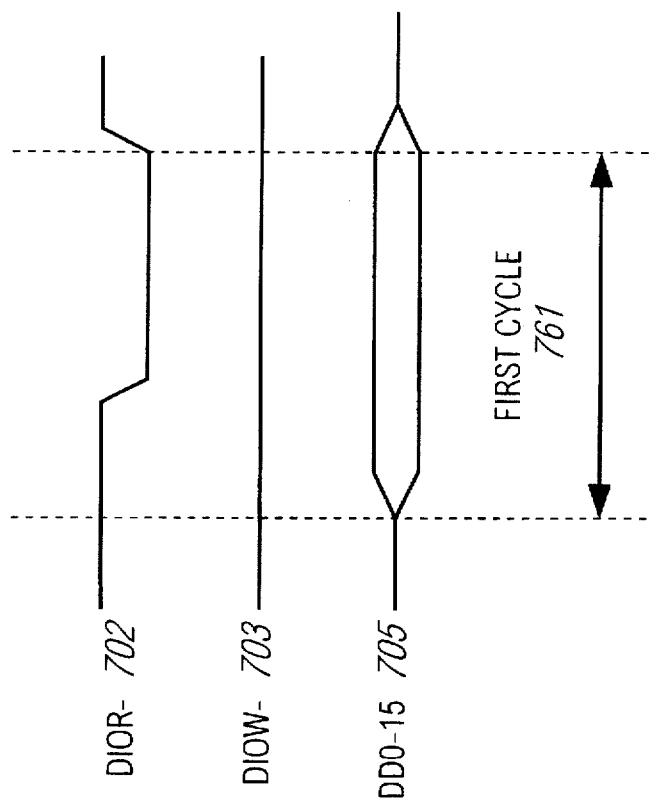
Figure 7E:
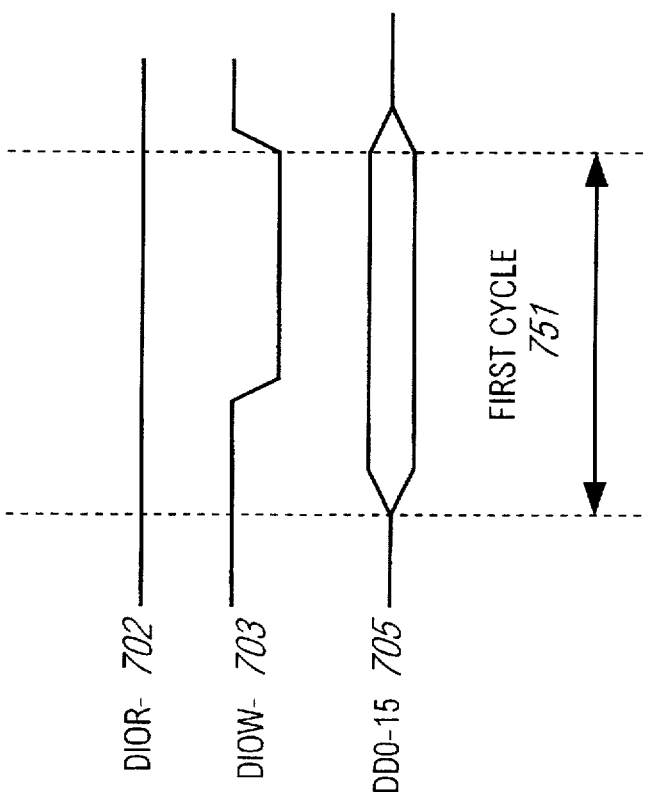

FIGS. 7E and 7F illustrate waveform timing diagrams for register read and write operations for registers contained within the PCMCIA peripheral, IR peripheral, or the registers 908 within a socket controller 220 or 221 as illustrated in FIGS. 9A and 9B. Table 5A below represents the operational cycle performed for a register read or write operation. Prior to a standard register read or write operation within a given socket controller, an index register write operation may occur to properly address a desired register. In this case the cycle of operations as illustrated in Table 5B is applicable. When the index register bit is set to a logical one value the register write operation is a global operation to all index registers within each socket controller. The socket number zero through three is indicated by bits 7 and 6 while the pointer or register address for a given register or register set is indicated by bits 0–5 during the index register write operation. In the second cycle as indicated by Table 5B or in an independent cycle as indicated by Table 5A wherein the index register bit is set to logical zero, a register read or write operation may occur to a register pointed to by the value that is presently stored within the index register. For the register read operation information simultaneously flows from the system adapter to the socket controller and from the socket controller to the system adapter during the same cycle and using the same bus of data signal lines. The system adapter drives the socket number and other information on data signal lines (DD8–15) while the socket controller drives data onto data signal lines DD0–7 in response.

TABLE 5A

| DD bit # | 15 | 14 | 13 | 12 11 | 10 | 9 | 8 7 6 5 4 3 2 1 0 |
|---|---|---|---|---|---|---|---|
| Cycle 1 | 1 | 1 | 1 | socket# | index | 0 | 0 register data7–0 |

TABLE 5B

| DD bit # | 15 | 14 | 13 | 12 11 | 10 | 9 | 8 7 6 5 4 3 2 1 0 |
|---|---|---|---|---|---|---|---|
| Cycle 1 | 1 | 1 | 1 | socket # | index=1 | 0 | 0 sckt reg address |
| Cycle 2 | 1 | 1 | 1 | socket # | index=0 | 0 | 0 register data7–0 |

Referring to Table 5A, in the first cycle 751 of a register write operation, the system adapter 204 provides within the first cycle 741 the special window number 7 hexadecimal on data lines (DD13–15) indicating that it is not a memory or I/O operation to the PCMCIA peripheral, an op code 00 onto the data lines (DD8–9) which indicates a register operation, PCMCIA socket number on data lines (DD11–12), and index register bit on data line (DD10). Actual data to be stored into the register is provided by the system adapter on data lines (DD0–7) and DIOW- is strobed to signal the socket controller to capture this data into the selected register or registers. If the index register bit is set to a logical one value a global write operation can occur wherein the data on data lines (DD0–7) is written into each index register of each socket controller. For each socket controller the index register is globally written and individually read by the system adapter. The value stored in the index register represents a pointer into what register set and what slot or socket number is to be accessed. If the value of bits 7 and 6 written to a given index register within a socket controller match the one or two unique device ID or slot numbers that may have been given upon the reset configuration of a socket controller as previously discussed, then the given socket controller having a matching slot number will be accessed. Otherwise if the value of bits 7 and 6 do not match the initial one or two slot numbers provided upon initialization to the given socket controller, then the socket controller does not respond. The value of bits 7 and 6 of the index register represent which register set related to the corresponding socket number are to be accessed.

FIG. 7F illustrates a timing diagram for a register read operation. During the first cycle 761 of a register read operation, the system adapter 204 provides the special window number 7 hexadecimal on data lines (DD13–15) indicating that it is not a memory or I/O operation to the PCMCIA peripheral, an op code 00 onto the data lines (DD8–9) which indicates a register operation, if applicable the PCMCIA socket number on data lines (DD11–12) indicating access to a register set corresponding to the socket number, and the register index bit on data line (DD10) representing whether the index register within the socket controller is to be read. DIOR- is strobed by the system adapter to signal the socket controller to drive data lines (DD0–7) with the contents of the selected register. During the register read operation information simultaneously flows from the system adapter to the socket controller and from the socket controller to the system adapter during the same cycle and using the same bus of data signal lines.

Figure 7G:
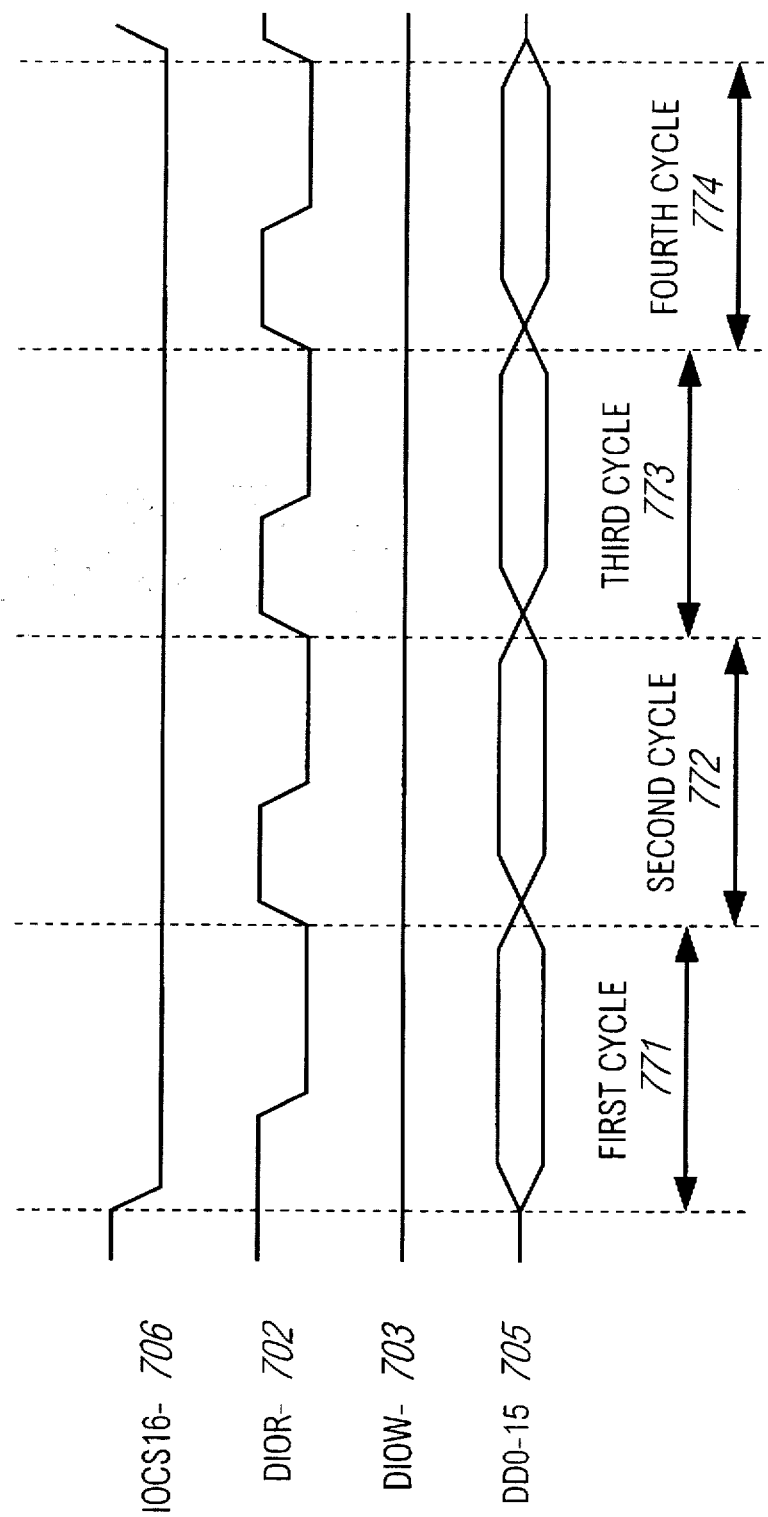
Figure 10:
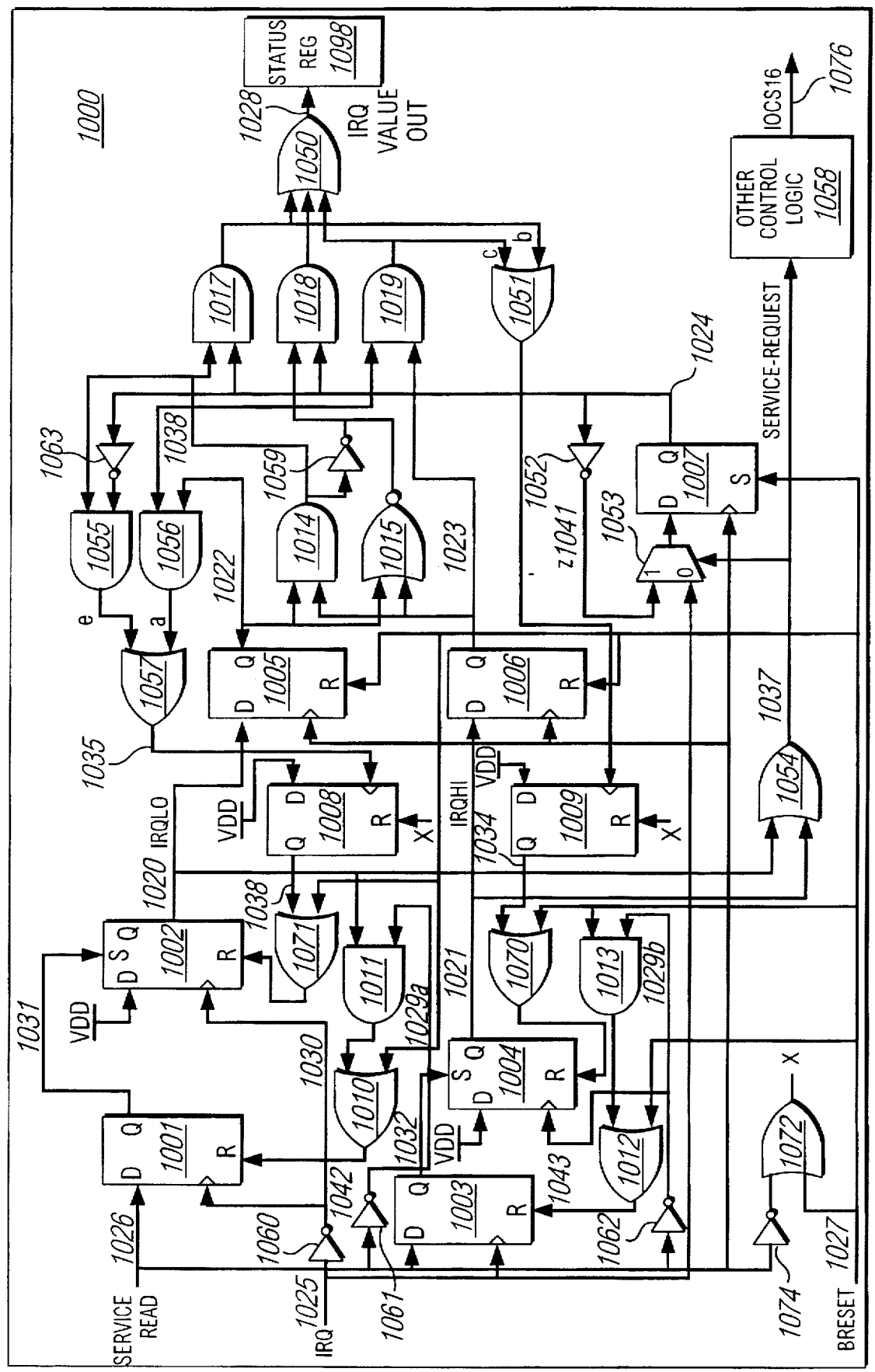
FIG. 10 illustrates a schematic diagram of the detection logic circuitry within the socket controller integrated circuit for the interrupt request signal IRQ.

FIG. 7G illustrates a timing diagram for a service request operation. A computer system may have a plurality of socket controllers on a given cable. The ATA hard drives do not assert IOCS16- unless either CS1FX- or CS3FX- are active low. When both CS1FX- and CS3FX- are inactive high the socket controller can request a service request by driving IOCS16- 706 active low to a logical zero. IOCS16- is released by the socket controller after the socket requesting service has been polled and there are no other sockets requesting service. In FIG. 7G IOCS16- is released by the socket controller after the fourth socket has been polled and it was determined that this was the last socket requesting service. The system adapter 204 polls each peripheral within each socket to determine what peripherals may have requested service. The number of cycles required by the polling process for the service request may vary from one to four cycles 771–774 for a given system adapter and socket controllers 220A–D or 221A–B because each PCMCIA peripheral within a socket or socket interface needs to be polled to determine whether it has requested service. Table 6 below illustrates the operational cycle that may be repeated until all service requests are acknowledged.

to the system adapter 204 by a status detection logic circuit. A schematic for a status detection logic circuit 1000 for the management interrupt request signal IRQ is illustrated in FIG. 10. A status detection logic circuit for the management interrupt signal IRQ, as illustrated in FIG. 10, is included within each of the socket controllers 220A–D and 221A–B. An identical status detection logic circuit is included within each of the socket controllers 220A–D and 221A–B for each of the following signals: the battery voltage detect signals BVD1 and BVD2; the ready interrupt request signal RDY/IRQ; the infrared interrupt request signal IR_IRQ; the card okay signal CARD_OK; and the direct memory access request signal DMA_REQ. It will be apparent to those skilled in the art that: the status detection logic circuitry for the above listed signals will operate identically to the status detection logic circuitry illustrated for the management interrupt signal IRQ.

TABLE 6

| DD bit # | 15 | 14 | 13 | 12 | 11 | 10 | 98 | 765 | 4 | 3 | 2 | 1 | 0 |
|---|---|---|---|---|---|---|---|---|---|---|---|---|---|
| Cycle 1 | 1 | 1 | 1 | socket # | index | 01 | 000 | ir | spkr | card | mgt | dma |

During each cycle 771–774 of a service request operation, the system adapter 204 provides a service request op code 10 respectfully onto the data lines (DD8–9), the PCMCIA socket number on data lines (DD11–12), and the special window number 7 hexadecimal (111 binary) on data lines (DD13–15) of the ATA interface and cable. After the system adapter 204 drives this information on the data lines (DD8–15) it drives DIOR- 702 active low to have one of the socket controllers 220A–D drive out on data lines (DD0–7) what type of service request may be requested by one of the peripherals. Data line (DD0) indicates if a peripheral within a given socket is requesting direct memory access (DMA) in order to write or read data directly from the array of system memory. Data line (DD1) indicates if a peripheral is requesting a management service request resulting from a change of socket status such as card removal or insertion. Data line (DD2) indicates whether a card service request is pending. Data line (DD3) indicates if a speaker level service request for the PCMCIA peripheral is pending. Data line (DD4) indicates if an infrared peripheral service request is pending. Data lines (DD5–7) are reserved bits and all are presently driven to a logical zero state. If any of these types of service requests are needed by the peripheral within the given slot the data lines (DD0–4) are driven to a logical one state within the cycle. The system adapter upon receiving the type of service requests passes the service request type to the host CPU or DMA controller in the case of a DMA request. The host CPU interrupts itself at an appropriate moment and goes out to perform the operations necessary to satisfy the type of service requested. The service request operation is similar to the register read operation in that information simultaneously flows from the system adapter to the socket controller and from the socket controller to the system adapter during the same cycle and using the same bus of data signal lines. The system adapter drives the socket number and other information on data signal lines (DD8–15) while the socket controller drives data onto data signal lines DD0–7 in response.

Communication of Changes in Status

Changes in status of the peripherals coupled to the socket controllers 220A–D and 221A–B are detected and reported The status detection logic circuit 1000, as illustrated in FIG. 10, detects and reports changes in the status of the management interrupt request signal IRQ, for a socket controller. The detected changes in the status of the management interrupt signal IRQ are reported to the system adapter 204 during a service read of the status register 1098 within the respective socket controller. Multiple changes in the status of the management interrupt signal IRQ are detected and reported to the system adapter 204, in the correct order, by the status detection logic circuitry.

The management interrupt request signal IRQ is generated by a peripheral coupled to the respective socket controller 220A–D or 221A–B. The management interrupt request signal line 1025 is coupled to the input of the inverter 1060, to the strobe input of the flip flop 1003, to the strobe input of the flip flop 1004 and to the logical low input of the multiplexer 1053. The output of the inverter 1060 is coupled to the strobe input of the flip flop 1001 and to the strobe input of the flip flop 1002.

The system reset signal BRESET is generated by the system adapter 204 upon a power-on or system reset. The system reset signal line 1027 is coupled as an input to the logical OR gates 1010, 1012, 1070, 1071 and 1072, as the reset input to the flip flops 1005 and 1006 and as the set input to the flip flop 1007.

The service read signal SERVICE READ is generated by the system adapter 204 to initiate a read of the status register 1098. The service read signal line 1026 is coupled to the D inputs of the flip flops 1001 and 1003, to the inputs of the inverters 1061, 1062 and 1074 and to the strobe inputs of the flip flops 1005, 1006 and 1007.

The output of the inverter 1061 is coupled as an input to the logical AND gate 1011. The output of the inverter 1062 is coupled as an input to the logical AND gate 1013. The output of the inverter 1074 is coupled as an input to the logical OR gate 1072. The output X of the logical OR gate 1072 is coupled to the reset input of the flip flop 1008 and to the reset input of the flip flop 1009.

The Q output of the flip flop 1001 is coupled to the set input of the flip flop 1002. The D input of the flip flop 1002 is coupled to the supply voltage VDD. The Q output of the flip flop 1002 is the interrupt request low signal IRQLO 1020 and is coupled to the D input of the flip flop 1005, as an input to the logical AND gate 1011 and as an input to the logical OR gate 1054. The D input of the flip flop 1008 is coupled to the supply voltage VDD. The Q output of the flip flop 1008 is coupled as an input to the logical OR gate 1071. The output of the logical OR gate 1071 is coupled to the reset input of the flip flop 1002. The output of the logical AND gate 1011 is coupled as an input to the logical OR gate 1010. The output of the logical OR gate 1010 is coupled to the reset input of the flip flop 1001.

The Q output of the flip flop 1003 is coupled to the set input of the flip flop 1004. The D input of the flip flop 1004 is coupled to the supply voltage VDD. The Q output of the flip flop 1004 is the interrupt request high signal IRQHI 1021 and is coupled to the D input of the flip flop 1006, as an input to the logical AND gate 1013 and as an input to the logical OR gate 1054. The D input of the flip flop 1009 is coupled to the supply voltage VDD. The Q output of the flip flop 1009 is coupled as an input to the logical OR gate 1070. The output of the logical OR gate 1070 is coupled to the reset input of the flip flop 1004. The output of the logical AND gate 1013 is coupled as an input to the logical OR gate 1012. The output of the logical OR gate 1012 is coupled to the reset input of the flip flop 1003.

The output of the logical OR gate 1054 is the service request signal SERVICE-REQUEST 1037. The output of the logical OR gate 1054 is coupled to the selecting input of the multiplexer 1053 and to the other control logic circuitry 1058. The other control logic circuitry 1058 generates the signal IOCS16 1076 used to signal to the system adapter 204 that the socket controller requires service.

The Q output of the flip flop 1005 is coupled as an input to the logical AND gate 1056, as an input to the logical AND gate 1014 and as an input to the logical NOR gate 1015. The Q output of the flip flop 1006 is coupled as an input to the logical AND gate 1019, to the logical AND gate 1014 and to the logical NOR gate 1015. The output of the logical AND gate 1014 is coupled to the input of the inverter 1059, as an input to the logical AND gate 1017 and as an input to the logical AND gate 1055. The output of the inverter 1059 is coupled as an input to the logical AND gate 1019 and as an input to the logical AND gate 1056. The output of the logical NOR gate 1015 is coupled as an input to the logical AND gate 1018.

The output of the multiplexer 1053 is coupled to the D input of the flip flop 1007. The Q output of the flip flop 1007 is coupled to the inputs of the inverters 1052 and 1063 and as an input to the logical AND gates 1017 and 1018. The output of the inverter 1052 is coupled to the logical high input of the multiplexer 1053. The output of the inverter 1063 is coupled as an input to the logical AND gate 1055. The output of the logical AND gate 1055 is coupled as an input to the logical OR gate 1057. The output of the logical AND gate 1056 is coupled as an input to the logical OR gate 1057. The output of the logical OR gate 1057 is coupled to the strobe input of the flip flop 1008.

The output of the logical AND gate 1017 is coupled as an input to the logical OR gates 1050 and 1051. The output of the logical AND gate 1018 is coupled as an input to the logical OR gate 1050. The output of the logical AND gate 1019 is coupled as an input to the logical OR gates 1050 and 1051. The output of the logical OR gate 1051 is coupled to the strobe input of the flip flop 1009. The output of the logical OR gate 1050 is the interrupt request value out signal IRQ VALUE OUT 1028. The output of the OR gate 1050 is coupled to the status register 1098.

The status detection logic circuitry 1000 monitors changes in the status of the interrupt request signal IRQ. In response to a change in the status of the interrupt request signal IRQ, the status detection logic circuitry 1000 generates a service request signal SERVICE-REQUEST. The other control logic circuitry 1058 will then activate the signal IOCS16 and notify the system adapter 204 that one of the socket controllers 220A-D or 221A-B is requesting service, as described above. In response, the system adapter 204 will initiate a service read operation by activating the service read signal SERVICE READ and then reading the contents of the status register 1098.

The status detection logic circuitry 1000 of the present invention is designed so that it can capture multiple changes in the status of the interrupt request signal IRQ. In the event that the status of the interrupt request signal IRQ changes while the status detection logic circuitry 1000 is waiting for a service read or while a service read operation is being conducted, the status detection logic circuitry 1000 of the present invention will capture these additional transitions and report them to the system adapter 204.

The flip flop 1001 is utilized by the status detection logic circuitry 1000 to capture transitions of the interrupt request signal IRQ from a logical high voltage level to a logical low voltage level when the service read signal SERVICE READ is active. The flip flop 1002 is utilized by the status detection logic circuitry 1000 to capture transitions of the interrupt request signal IRQ from a logical high voltage level to a logical low voltage level when the service read signal SERVICE READ is inactive. The flip flop 1003 is utilized by the status detection logic circuitry 1000 to capture transitions of the interrupt request signal IRQ from a logical low voltage level to a logical high voltage level when the service read signal SERVICE READ is active. The flip flop 1004 is utilized by the status detection logic circuitry 1000 to capture transitions of the interrupt request signal IRQ from a logical low voltage level to a logical high voltage level when the service read signal SERVICE READ is inactive.

The flip flops 1001, 1002, 1003, 1004, 1005, 1006 and 1007 are all reset upon a power-on or system reset when the reset signal BRESET is activated. The flip flops 1001, 1003, 1008 and 1009 are also reset after a service read operation. The flip flop 1008 is utilized by the status detection logic circuitry 1000 to control when the flip flop 1002 is cleared and to determine whether a new transition is captured. The flip flop 1009 is utilized by the status detection logic circuitry 1000 to control when the flip flop 1004 is cleared and to determine whether a new transition is captured.

The multiplexer 1053 is utilized by the status detection logic circuitry 1000 to allow the system adapter 204 to read the current value of the interrupt request signal IRQ when both of the interrupt request signal lines IRQLO and IRQHI are at a logical low voltage level. The flip flop 1007 is utilized by the status detection logic circuitry 1000 to determine which transition happened first in the event that multiple transitions occur. For a system with an active high interrupt request signal IRQ, where the interrupt signal IRQ is normally at a logical low voltage level and will transition to a logical high voltage level on the occurrence of a triggering event, the output of the flip flop 1007 should be initialized to a logical low voltage level upon a power-on or system reset. This is ensured by coupling the reset signal BRESET to the reset input of the flip flop 1007. For a system with an active low interrupt signal IRQ, where the interrupt signal IRQ is normally at a logical high voltage level and will transition to a logical low voltage level on the occurrence of a triggering event, the output of the flip flop 1007 should be initialized to a logical high voltage level upon a power-on or system reset. In order to initialize the flip flop 1007 to a logical high voltage level the reset signal BRESET should be coupled to the set input of the flip flop 1007 rather than to the reset input of the flip flop 1007, as illustrated in FIG. 10.

Figure 11:
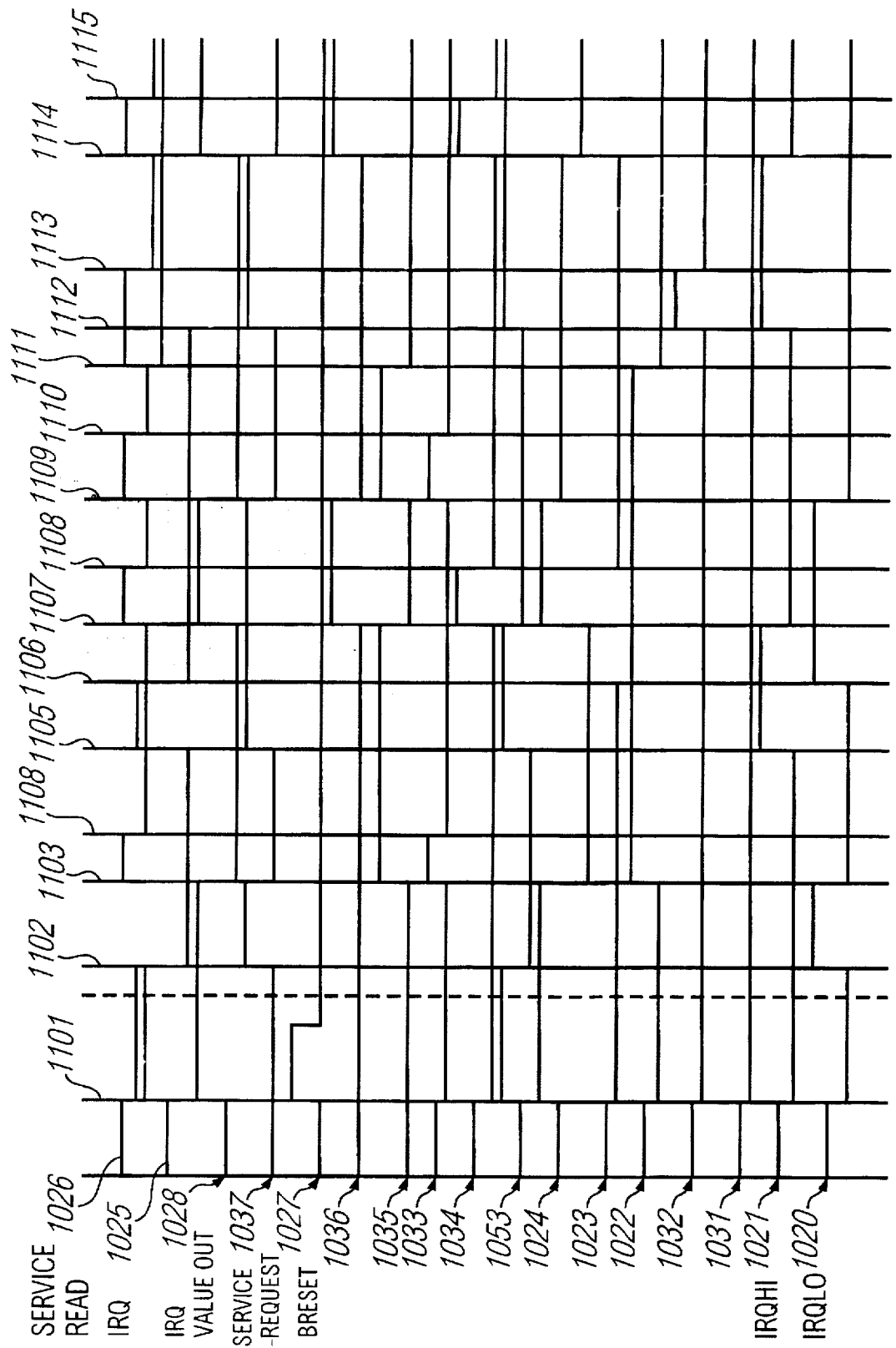
FIG. 11 illustrates a timing diagram for selected signals within the detection logic circuitry illustrated in FIG. 10.

FIG. 11 illustrates a timing diagram of selected signals within the status detection logic circuitry 1000. Each signal line on the timing diagram is labelled with a reference number corresponding to the location of the signal line in the schematic of the circuitry illustrated in FIG. 10.

At the location 1101, the system reset signal BRESET is activated thereby resetting the Q output 1031 of the flip flop 1001, the Q output 1020 of the flip flop 1002, the Q output 1032 of the flip flop 1003, the Q output 1021 of the flip flop 1004, the Q output 1022 of the flip flop 1005 and the Q output 1023 of the flip flop 1006 all to a logical low voltage level and setting the Q output 1024 of the flip flop 1007 to a logical high voltage level.

At the location 1102, an interrupt event happens, causing the interrupt request signal IRQ 1025 to transition to a logical low voltage level. This transition of the interrupt request signal IRQ 1025 from a logical high voltage level to a logical low voltage level causes the interrupt request low signal IRQLO 1020 to rise to a logical high voltage level causing the service request signal SERVICE REQUEST 1037 to also rise to a logical high voltage level. When the service request signal SERVICE REQUEST 1037 rises to a logical high voltage level the other control logic circuitry 1058 will generate a signal on the signal line IOCS16 1076, as described above. In response to the signal on the signal line IOCS16 1076, the system adapter 204 initiates a service read operation by activating the service read signal SERVICE READ 1026 at the location 1103.

In response to the service read signal SERVICE READ 1026 being activated, the service request signal SERVICE REQUEST 1037 is deactivated, the Q output 1022 of the flip flop 1005 rises to a logical high voltage level and the interrupt request value out signal IRQ VALUE OUT 1028 transitions from a logical high voltage level to a logical low voltage level. Because the service read signal SERVICE READ 1026 is at a logical high voltage level and the service request signal SERVICE REQUEST 1037 is at a logical low voltage level, the Q output 1024 of the flip flop 1007 drops to a logical low voltage level. In response, the strobe input signal line 1035 of the flip flop 1008 rises to a logical high voltage level causing the Q output 1033 of the flip flop 1008 to also rise to a logical high voltage level, thereby clearing the flip flop 1002 and causing the interrupt request low signal line IRQLO 1020 to fall to a logical low voltage level.

At the location 1104, the service read signal SERVICE READ 1026 is deactivated, thereby resetting the flip flop 1008, causing the Q output 1033 of the flip flop 1008 to fall to a logical low voltage level. At the location 1105, the event causing the interrupt is corrected and the interrupt request signal IRQ 1025 transitions from a logical low voltage level to a logical high voltage level causing the interrupt request high signal IRQHI 1021 to rise to a logical high voltage level, thereby activating the service request signal SERVICE REQUEST 1037. In response to the service request signal SERVICE REQUEST 1037 rising to a logical high voltage level, the other control logic circuitry 1058 generates a signal on the signal line IOCS16 1076 which notifies the system adapter 204 that one of the socket controllers is requesting a service read operation.

Before the system adapter 204 can initiate the service read operation, an interrupt event occurs and the interrupt request signal IRQ transitions again, falling to a logical low voltage level at the location 1106, causing the interrupt request low signal line IRQLO 1020 to rise to a logical high voltage level, thereby capturing this transition of the interrupt request signal IRQ 1025. This transition does not activate the service request signal SERVICE REQUEST 1037 because it was activated at the previous transition of the interrupt request signal IRQ 1025 and has not yet been cleared.

At the location 1107, the system adapter 204 initiates a service read operation by activating the service read signal SERVICE READ 1026. In response to the service read signal SERVICE READ 1026 being activated, the Q output 1023 of the flip flop 1006 rises to a logical high voltage level and the interrupt request value out signal IRQ VALUE OUT 1028 transitions from a logical low voltage level to a logical high voltage level. Because the service read signal SERVICE READ 1026 and the service request signal SERVICE REQUEST 1037 are both at a logical high voltage level, the Q output 1024 of the flip flop 1007 rises to a logical high voltage level. In response, the strobe input signal line 1035 of the flip flop 1008 falls to a logical low voltage level and the strobe input signal line 1036 of the flip flop 1009 rises to a logical high voltage level, causing the Q output 1034 of the flip flop 1009 to also rise to a logical high voltage level, thereby clearing the flip flop 1004 and causing the interrupt request high signal line IRQHI 1021 to fall to a logical low voltage level. The service request signal SERVICE REQUEST 1037 is not deactivated at the location 1107 because the interrupt request signal IRQ had transitioned twice before the service read operation was initiated.

At the location 1108, the service read signal SERVICE READ 1026 is deactivated thereby resetting the flip flop 1009, causing the Q output 1034 of the flip flop 1009 to fall to a logical low voltage level.

At the location 1109, the system adapter 204 initiates a service read operation by activating the service read signal SERVICE READ 1026. In response, the service request signal SERVICE REQUEST 1037 is deactivated, the Q output 1023 of the flip flop 1006 falls to a logical low voltage level and the interrupt request value out signal IRQ VALUE OUT 1028 transitions from a logical high voltage level to a logical low voltage level. Because the service read signal SERVICE READ 1026 is at a logical high voltage level and the service request signal SERVICE REQUEST 1037 is at a logical low voltage level, the Q output 1024 of the flip flop 1007 falls to a logical low voltage level. In response, the strobe input signal line 1035 of the flip flop 1008 rises to a logical high voltage level causing the Q output 1033 of the flip flop 1008 to also rise to a logical high voltage level, thereby clearing the flip flop 1002 and causing the interrupt request low signal line IRQLO 1020 to fall to a logical low voltage level. Also in response, the strobe input signal line 1036 of the flip flop 1009 falls to a logical low voltage level.

At the location 1110, the service read signal SERVICE READ 1026 is deactivated, thereby resetting the flip flop 1008, causing the Q output 1033 of the flip flop 1008 to fall to a logical low voltage level. At the location 1111, the system adapter 204 initiates a service read operation by activating the service read signal SERVICE READ 1026. In response, the Q output 1022 of the flip flop 1005 falls to a logical low voltage level causing the strobe input 1035 of the flip flop 1008 to fall to a logical low voltage level.

During this service read operation, at the location 1112, the interrupt request signal IRQ transitions from a logical low voltage level to a logical high voltage level, causing the interrupt request high signal IRQHI 1021 to rise to a logical high voltage level, thereby activating the service request signal SERVICE REQUEST 1037. In response, the other control logic circuitry 1058 generates a signal on the signal line IOCS16 1076 which notifies the system adapter 204 that one of the socket controllers is requesting a service read operation. Because the service read signal SERVICE READ 1026 was at an active high voltage level, at the transition of the interrupt request signal IRQ 1025 from a logical low voltage level to a logical high voltage level, the Q output 1032 of the flip flop 1003 rises to a logical high voltage level.

At the location 1113, the service read operation is completed and the service read signal SERVICE READ 1026 is deactivated, thereby clearing the flip flop 1003 causing the Q output 1032 of the flip flop 1003 to fall to a logical low voltage level.

At the location 1114, the system adapter 204 initiates a service read operation by activating the service read signal SERVICE READ 1026. In response, the service request signal SERVICE REQUEST 1037 is deactivated, causing the Q output 1023 of the flip flop 1006 to rise to a logical high voltage level and the interrupt request value out signal IRQ VALUE OUT 1028 to rise to a logical high voltage level. The Q output 1024 of the flip flop 1007 rises to a logical high voltage level causing the strobe input signal line 1036 of the flip flop 1009 to rise to a logical low voltage level and the Q output 1034 of the flip flop 1009 to rise to a logical high voltage level, thereby clearing the flip flop 1004 and causing the interrupt request high signal line IRQHI 1021 to fall to a logical low voltage level.

At the location 1115, the service read operation is completed and the service read signal SERVICE READ 1026 is deactivated, thereby resetting the flip flop 1009, causing the Q output 1034 of the flip flop 1009 to fall to a logical low voltage level.

While the status detection logic circuitry 1000 for the interrupt request signal IRQ has been illustrated and described in detail, it should be apparent to those skilled in the art that similar status detection logic circuitry can be included for other selected signals from a PCMCIA card.

Future enhancements and expansion of the WIC protocol are available through use of the reserved bits. One such enhancement is the capability to burst data across the ATA cable between the system adapter 204 and a socket controller 220A–D. In this case the first cycle would set an initial starting address and thereafter a continuous set of cycles would directly burst a number of bytes of data across the ATA cable until an indication that the transfer was complete. Other enhancements would provide support for other types of peripheral devices such as a wireless transceiver.

Figure 3A:
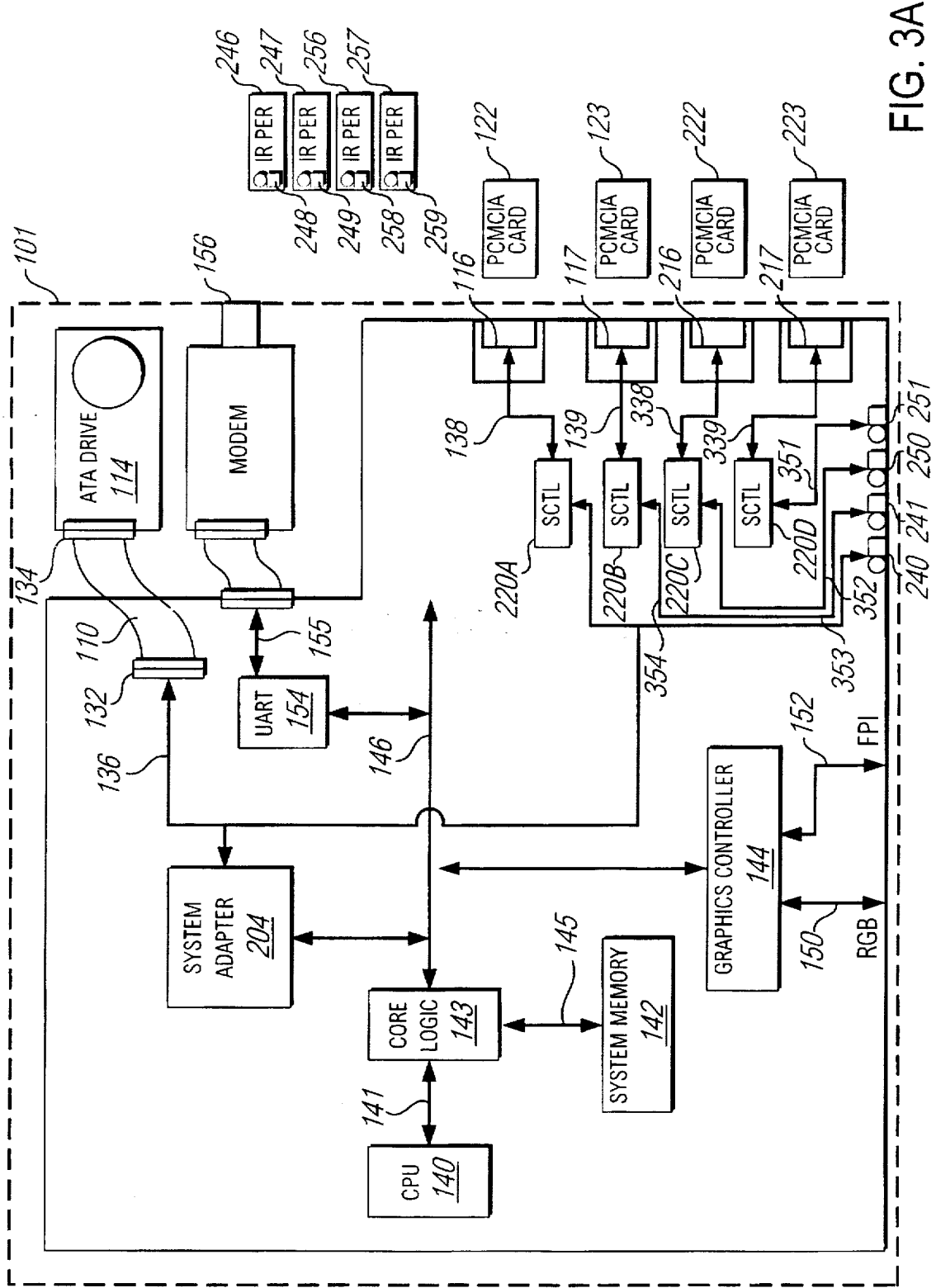
FIGS. 3A and 3B illustrate block diagram schematics for portable computer systems according to the present invention which include a system adapter integrated circuit and a socket controller integrated circuit.
Figure 3B:
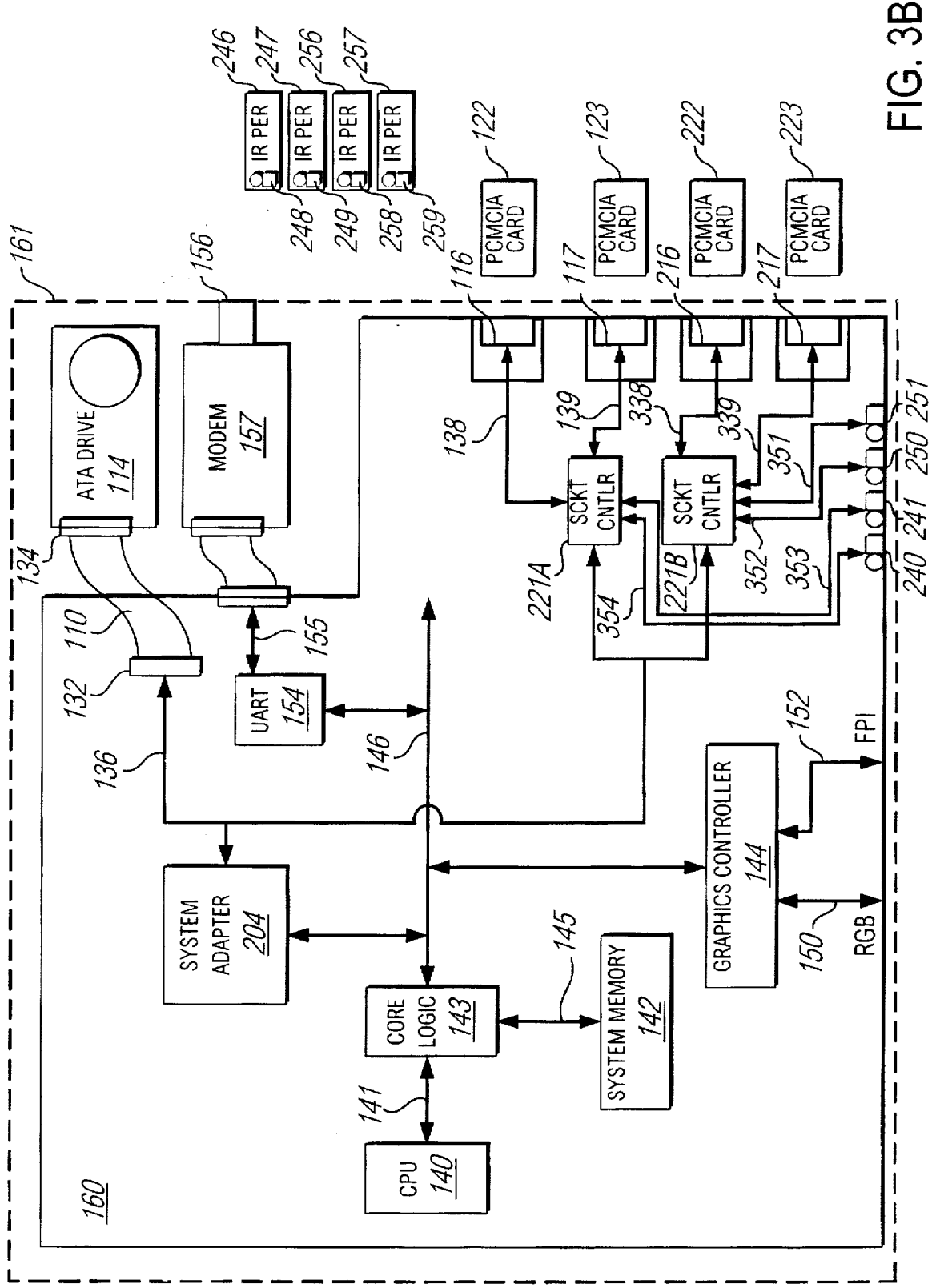

A block diagram schematic for a portable computer system according to the present invention is illustrated in FIGS. 3A–B. which include a system adapter 204 and socket controllers 220A–D or 221A–B, all of which may be integrally coupled to the motherboard 160. Alternatively the socket controllers may be coupled to a daughter board and coupled to the motherboard through either a socket connector, a cable, or a flexible printed circuit board. The system adapter may also be alternatively coupled to the motherboard. The system adapter 204 is coupled to the ATA disk drive 114 and to socket controllers 220A–D or 221A–B by the bus of signal traces 136. Socket controller 220A is coupled to the first PCMCIA expansion slot 116 by the bus of signal traces 138, socket controller 220B is coupled to the second PCMCIA expansion slot 117 by the bus of signal traces 139, socket controller 220C is coupled to the third PCMCIA expansion slot 216 by the group of signal traces 338, and socket controller 220D is coupled to the fourth PCMCIA expansion slot 217 by the bus of signal traces 339. FIG. 3B illustrates a block diagram schematic similar to FIG. 3A but utilizing socket controllers 221A and 221B that are capable of supporting more than one slot. Socket controller 221A is coupled to the first PCMCIA expansion slot 116 and the second PCMCIA expansion slot 117. Socket controller 221B is coupled to the third PCMCIA expansion slot 216 and the fourth PCMCIA expansion slot 217. The following discussion with respect to socket controllers 220A–D of FIG. 3A is generally applicable to the socket controllers 221A–B of FIG. 3B. With respect to the functions and operations of the system adapter 204, the ATA disk drive 114 and socket controller 220A–D, the operation of the portable computer system illustrated in FIGS. 3A and 3B is nearly identical to the operation of the desktop computer system illustrated in FIGS. 2A and 2B that was described above. Block diagrams of the system adapter 204, socket controllers 220A–D, and socket controllers 221A–B are respectively illustrated in FIG. 8A, FIG. 9A, and FIG. 9B.

Figure 8A:
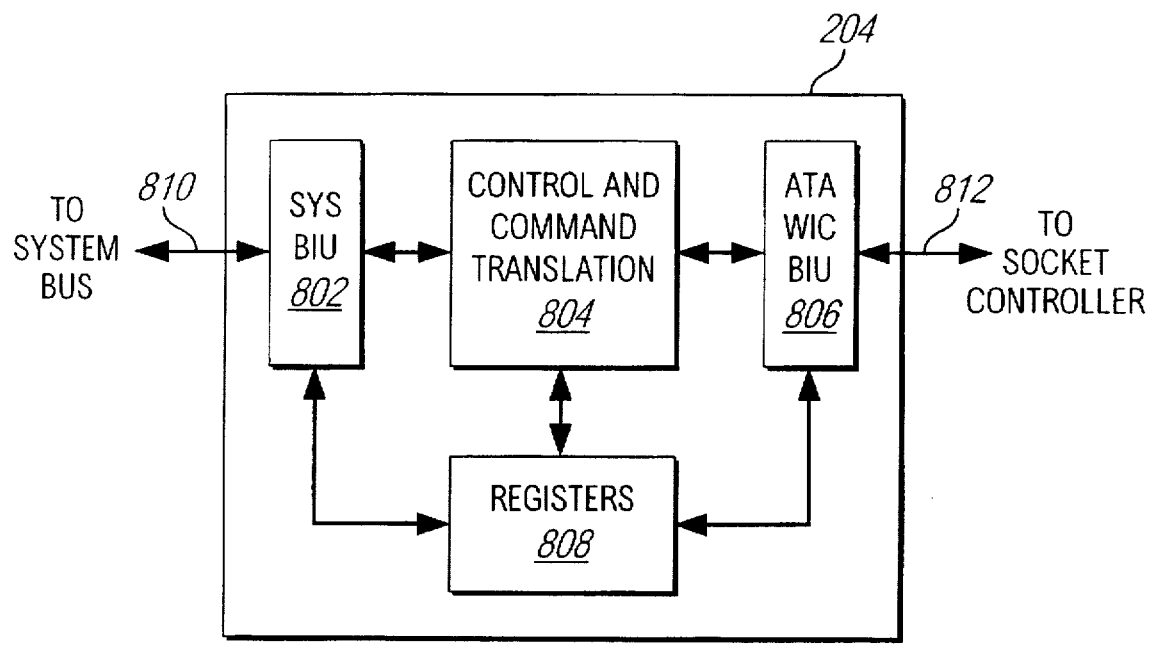
FIG. 8A illustrates a block diagram of a system adapter of the present invention for communication to a CPU as well as for communication to a hard disk drive and a socket controller using a multipurpose bus.
Figure 8B:
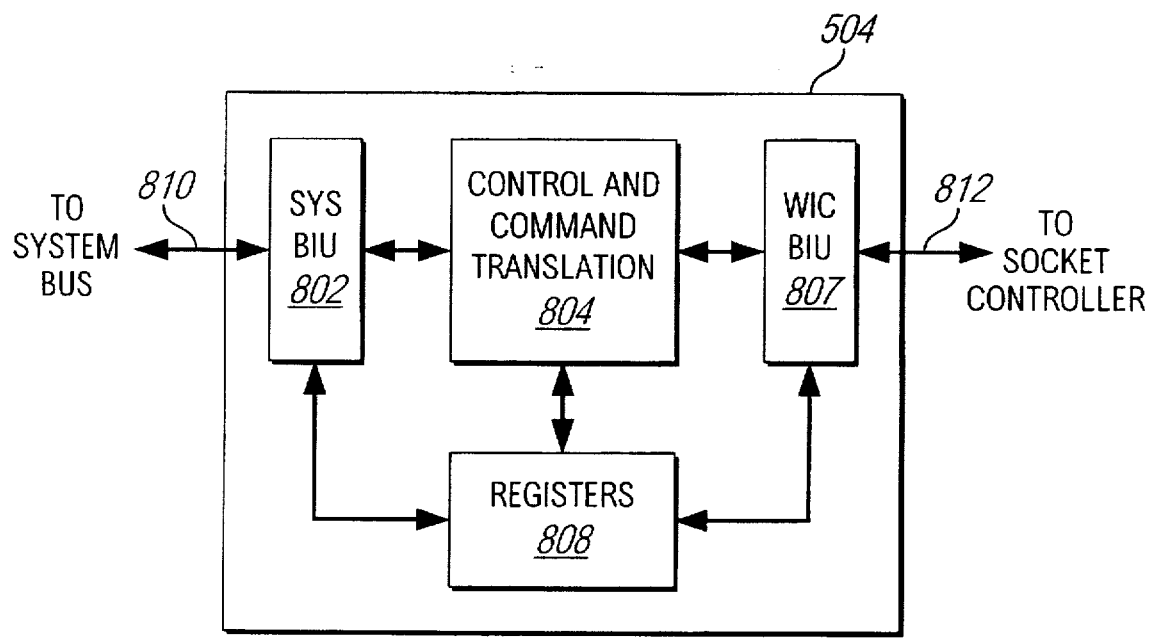
FIG. 8B illustrates a block diagram of a system adapter of the present invention for communication to a CPU and a socket controller.

Referring to FIG. 8A, a block diagram of the system adapter 204 of the present invention is illustrated having a system bus interface unit (SYSTEM BIU) 802, control and command translation circuit 804, ATA/WIC bus interface unit (ATA/WIC BIU) 806, and registers 808. FIG. 8B illustrates a block diagram of the system adapter 504 of the present invention which may be used in FIGS. 5 and 6. The ATA/WIC BIU 806 of FIG. 8A is modified to be a WIC bus interface unit (WIC BIU) 807 in FIG. 8B. Otherwise the following discussion regarding the system adapter 204 of FIG. 8A is generally applicable to the system adapter 504 as illustrated in FIG. 8B. The SYSTEM BIU 802 couples to a system bus that may be of various types such as ISA, LOCAL, or a PCI bus through bus 810. The SYSTEM BIU 802 is further coupled to the control and command translation circuit 804 and registers 808 within the system adapter 204. The command and control translation circuit 804 is coupled to the ATA/WIC BIU 806 or WIC BIU 807 as the case may be, registers 808, and the SYSTEM BIU 802. The ATA/WIC BIU 806 is coupled to an ATA cable, ATA signal lines, or an ATA equivalent bus through bus 812. The WIC BIU 807 is coupled to an ATA equivalent cable or bus via bus 812. The ATA/WIC BIU 806 implements both the ATA communications protocol as specified in the ATA specification and the WIC communications protocol previously described while the WIC BIU 807 only implements the WIC communications protocol. Registers 808 within the system adapter 204 assist in control of the data transfer, provide temporary storage for data that is being communicated if either bus 810 or 812 is busy, and provide status information to the host CPU for conditions that are monitored by the system adapter. Registers 808 consist of individually addressable registers for control and status and a FIFO for buffering the flow of data.

Data communicated between the host CPU and an ATA hard disk drive is accomplished by communication between the system adapter 204 and a hard disk drive 114 or 115 but this communication is not performed by the system adapter 504. Within the system adapter 204, data is transmitted and received to or from the host CPU 140 by the SYSTEM BIU 802 using the relevant bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data from the appropriate hard drive using ATA communication standards.

Data communicated between the host CPU and a PCMCIA or IR peripheral is accomplished by communication between the system adapter 204 or 504 and a socket controller. Within the system adapter 204, data is transmitted and received to or from the host CPU 140 by the SYSTEM BIU 802 using the relevant bus communication standard. The SYSTEM BIU 802 bidirectionally transfers data to the control and command translation circuit 804 which then bidirectionally transfers data to the ATA/WIC BIU 806 or WIC BIU 807 as the case may be. The ATA/WIC BIU 806 or WIC DIU 807 transmit and receive data from the appropriate socket controller using the WIC communication protocol.

FIG. 9A illustrates a block diagram of the socket controller 220 of the present invention having a WIC bus interface unit (WIC BIU) 902, registers 908, a control and command translation circuit 904, a DMA control circuit 914, an infrared (IR) controller circuit 907, and a slot controller circuit 906. FIG. 9B illustrates a block diagram of the socket controller 221 of the present invention which modifies the socket controller 220 to include the interface circuit 920. The interface circuit 920 includes bidirectional tristate buffers, a plurality of latches and multiplexors. The WIC BIU 902 couples to the ATA cable, ATA signal lines or an ATA equivalent bus through bus 910. The WIC BIU 902 is further coupled to the registers 908 and the control and command translation circuit 904 within the socket controller. In the case where socket controller 221 illustrated in FIG. 9B, represents the socket controllers 221A–B in FIGS. 2B, 3B, 5 and 6, two PCMCIA sockets and two IR transceivers are controlled by the given socket controller. The slot controller circuit 906 bidirectionally communicates address, data, joint control and joint status signals on bidirectional bus 926. On bus 925A the slot controller circuit 906 bidirectionally communicates separate control signals and separate status signals that are dedicated to socket number one. On bus 925B the slot controller circuit 906 bidirectionally communicates separate control signals and separate status signals that are dedicated to socket number two. Interface circuit 920 includes bidirectional tristate buffers, multiple latches and multiplexors in order to multiplex bus 926 into the two busses 927A and 927B. Address, data, and control signals intended for socket number one and driven onto bus 927A are selected from bus 926 when a signal on the data direction line 922 is selecting output and a signal on the select A line 921A is active. Address, data, and control signals intended for socket number two and driven onto bus 927B are selected from bus 926 when a signal on the data direction line 922 is selecting output and a signal on the select B line 921B is active. Address, data, status, and control signals from socket number one driven onto bus 926 are selected from bus 927A by the interface circuit 920 when a signal on the data direction line 922 is selecting input and a signal on the select A line 921A is active. Address, data, status, and control signals from socket number one driven onto bus 926 are selected from bus 927B by the interface circuit 920 when a signal on the data direction line 922 is selecting input and a signal on the select B line 921B is active. Bus 927A is combined with bus 925A to create a larger bus 912 to interface with socket number one. Bus 927B is combined with bus 925B to create a larger bus 913 to interface with socket number two. The IR controller 907 bidirectionally communicates with the IR transceiver number one on bus 916 and with IR transceiver number two on bus 917.

In the case where socket controller 220 illustrated in FIG. 9A, represents socket controllers 220A–D in FIGS. 2A and 3A, only one socket and one IR transceiver are being controlled by the given socket controller. The slot controller circuit 906 bidirectionally communicates address, data, control and status signals on bidirectional bus 926. On bus 925A the slot controller circuit 906 bidirectionally communicates separate control signals and separate status signals that are dedicated to slot or socket number one. Bus 925B from the slot controller circuit 906 is unused. Busses 925A and 926 are combined into one bus 924 to interface to the PCMCIA socket and only one bus 916 is used to interface to the IR transceiver while the busses 917 and 925B are unused.

In either case the slot controller circuit 906 is further coupled to the registers 908 and the control and command translation circuit 904. The control and command translation circuit 904 is coupled to the WIC BIU 902, the DMA control circuit 914, the registers 908, the infrared controller circuit 907, and the slot controller circuit 906 within the socket controller 220. The infrared controller circuit 907 may be coupled to IR transceivers 240,241,250,251 through bus 916 or bus 917. The infrared controller circuit 907 is further coupled to the control and command translation circuit 904 and the registers 908 within the socket controllers 220 and 221. The DMA controller 914 is coupled to the control and command translation circuit 904, the registers 908, and the slot controller 906 within the socket controllers 220 and 221.

The socket controllers 221 and 220 communicate with the system adapter 204 through bus 910 using the WIC protocol, with the PCMCIA peripheral devices either through busses 912 and 913, or bus 924 using the PCMCIA communication protocol, and with the IR peripheral devices through either or both busses 916 and 917 using a serial input and output communications format such as non-return to zero (NRZ). The WIC protocol described above is implemented by the WIC BIU 902. The slot controller 906 implements the communication with PCMCIA cards using the PCMCIA standards.

Data communicated between the host CPU 140 and the PCMCIA peripherals is accomplished by communication between the system adapter 204 and a socket controller 220 or 221. Within the system adapter 204, data is transmitted and received to or from the host CPU 140 by the SYSTEM BIU 802 using the relevant system bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data to or from the socket controller using the WIC protocol. If data needs to be buffered, a FIFO within the registers 808 may also temporarily hold data that is communicated between the CPU and the PCMCIA peripheral. Within the socket controller 220 or 221, data is transmitted and received to or from system adapter 204 by the WIC BIU 902 using the WIC protocol. The WIC BIU 902 bidirectionally transfers data to the control and command translation circuit 904 which then bidirectionally transfers data to the slot controller circuit 906 which then transmits and receives data from the appropriate slot and PCMCIA peripheral using PCMCIA communication standards. If data needs to be buffered, a FIFO within the registers 908 may also temporarily hold data that is communicated between the CPU and the PCMCIA peripheral.

Data communicated between system memory 142 and a PCMCIA peripheral for a DMA read or write operation is similar to the communication between the host CPU and a PCMCIA peripheral. In a system having an ISA system bus the DMA read or write operation is initiated by an external DMA controller device where the system adapter 204 responds by bidirectionally transferring data to or from system memory 142 instead of the host CPU 140. In a system having a PCI or VLBus system bus the system adapter has the responsibility for generating memory addresses into system memory and carries out the remaining DMA controller operations as required for the system busses. Within the system adapter 204, data is transmitted and received to or from the system memory 142 by the SYSTEM DIU 802 using the relevant system bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data to or from the socket controller using the WIC protocol. Within the socket controller 220 data is transmitted to or received from system adapter 204 by the WIC BIU 902 using the WIC protocol. In the case of a DMA read or write operation the DMA control circuit 914 assists the control and command translation circuit 904 in communicating data between the system memory 142 and the PCMCIA peripheral. As in host CPU to PCMCIA peripheral communication the slot controller circuit 906 transmits and receives data from the appropriate slot and PCMCIA peripheral using PCMCIA communication standards. If data needs to be buffered, a FIFO within the registers 908 may also temporarily hold data that is communicated between the system memory and the PCMCIA peripheral.

Data communicated between the host CPU and the IR peripherals is accomplished by communication between the system adapter 204 and the socket controller 220. Within the system adapter 204, data is transmitted and received to or from the host CPU 140 by the SYSTEM DIU 802 using the relevant bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data to or from the socket controllers 220 or 221 using the WIC protocol. Within socket controller 220 or 221 data is transmitted and received to or from system adapter 204 and then to the host CPU by the WIC BIU 902 using the WIC protocol. The WIC BIU 902 bidirectionally transfers data to the control and command translation circuit 904 which then bidirectionally transfers data to the IR controller circuit 907. The IR controller circuit 907 converts parallel data from the control and command translation circuit 904 into serial data to drive the IR transceivers 240, 241, 250, or 251. The IR controller circuit 907 also converts serial data from the transceiver 240,241, 250, or 251 into parallel data for communication to the control and command translation circuit 904. Included within the IR controller circuit 907 is a buffer such as a register or FIFO in order to properly match the speed of serial communication with that of the parallel communication.

The host CPU via the system adapter 204 may read data from or store data into the registers 908 which consist of an index register, global registers, slot registers, status registers, and may also consist of a FIFO. Amongst other things the index register activates a given socket controller and socket number through the methods described above. Registers designated as global registers assist in controlling portions of the entire socket adapter. The slot registers assist: in controlling portions of the interface to each individual slot. The status registers monitor conditions within the socket controller and provide status information that can be read by the host CPU. Data communicated between the host CPU and the PCMCIA peripheral cards flows through the WIC DIU 902, the control and command translation circuit, and the slot controller circuit 906. If data needs to be buffered, a FIFO within the registers 908 may also temporarily hold data that is communicated between the host CPU and the PCMCIA peripheral cards as well as other communication paths.

The socket controller as described above combines the functions of a PCMCIA host adapter and IR interface controller into a single device which saves space and conserves power consumption in a computer system. The combination of the socket controller and system adapter as described above reduces the connections and cables within the computer system case and allows more peripherals to be coupled to a computer system.

ALTERNATE EMBODIMENT

Figure 5:
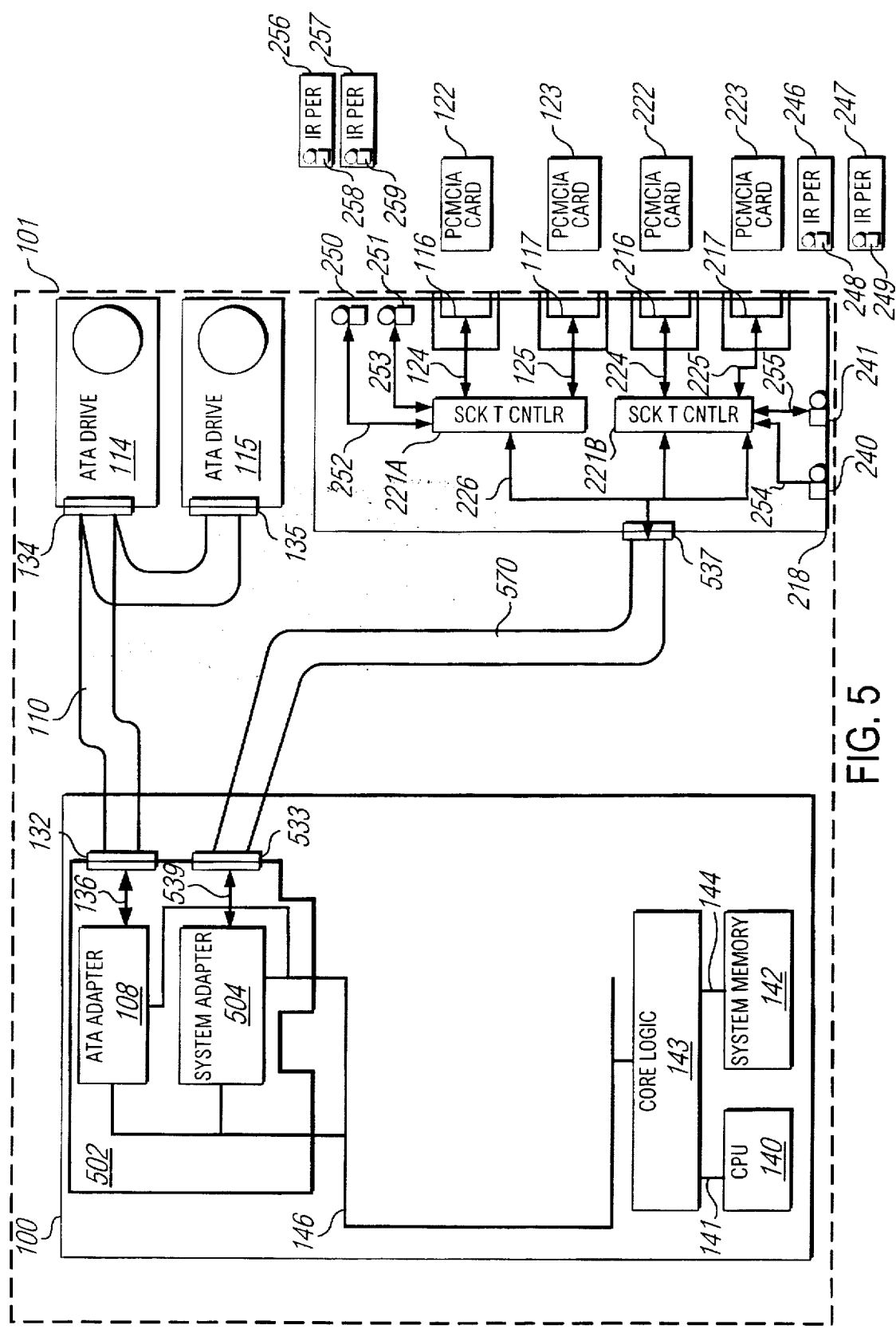
FIG. 5 illustrates a block diagram schematic for a desktop computer system according to the present invention which includes a system adapter integrated circuit and a socket controller integrated circuit. The expansion board 502 has a separate ATA adapter integrated circuit and a separate system adapter integrated circuit and is connected to separate cables for communication to the hard disk drives and the socket controllers respectively.
Figure 6:
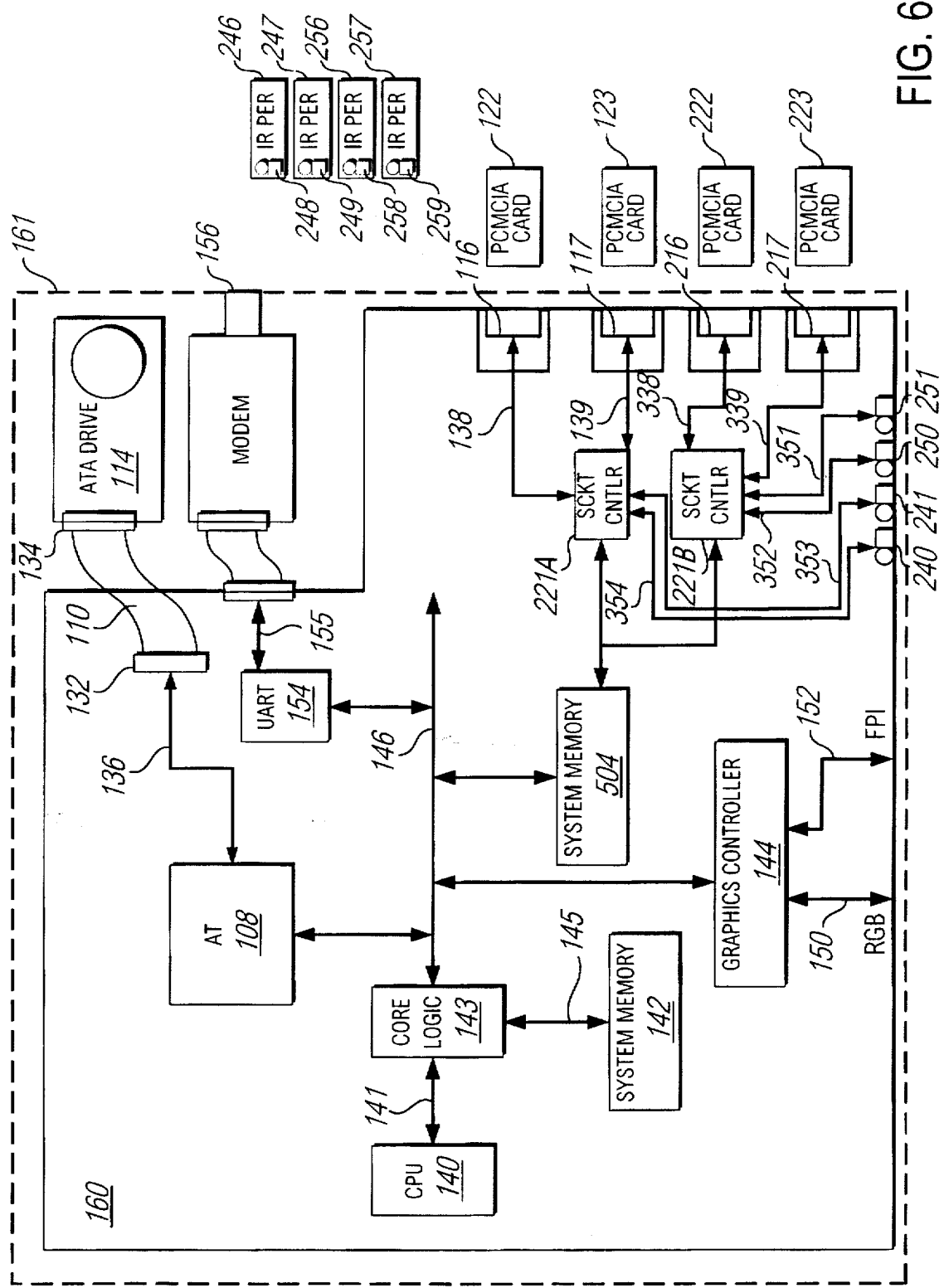
FIG. 6 illustrates a block diagram schematic for a portable computer system according to the present invention which includes a system adapter integrated circuit and a socket controller integrated circuit. The motherboard 160 has a separate ATA adapter integrated circuit and a separate system adapter integrated circuit which are connected to separate busses for communication to the hard disk drives and the socket controllers respectively.

In the system of the preferred embodiment as described above the PCMCIA and ATA functions have always been combined onto one system adapter 204. In some systems it may not be desirable to combine the ATA and PCMCIA functions together onto one piece of silicon or communicate across one cable. It may be desirable to separate the peripheral interface system into a specialized PCMCIA interface system and an ATA interface system. The specialized PCMCIA interface system would continue to use a system adapter integrated circuit, a peripheral communication bus or cable, and socket controller integrated circuits in order to facilitate the bidirectional communication between a host CPU and other peripheral devices. FIG. 5 illustrates a desktop computer system 101 having a separate ATA interface system and a separate specialized PCMCIA interface system. FIG. 6 illustrates a portable computer system 161 having the separate interface systems. In FIG. 5 the specialized PCMCIA interface system includes a plug in card such as interface card 502, system adapter integrated circuit 504, PCMCIA board 218, PCMCIA sockets 116, 117, 216, 217, socket controllers 221A and 221B, IR transceivers 240, 241, 250, 251, cable 570 and associated connectors 533, 537. The ATA interface system in FIG. 5 includes a plug in card that may be similar to interface card 502, an ATA adapter 108, a cable 110 and associated connectors 134, 132, and an ATA drive 114 and its associated hard disk driver controller (not illustrated). Referring to FIG. 6, the system adapter 504 interfaces to the system bus 146 and to the socket controllers 221A-B via bus 610. The socket controllers 221A-B interface to PCMCIA peripherals 122, 123, 222, 223 through the PCMCIA sockets 116, 117, 216, 217 by way of busses 138, 139, 338, 339. The socket controllers further interface to IR peripherals 246, 247, 256, 257 through the transceivers 240, 241, 250, 251 by way of the busses 351–354.

The separation of the interface systems and use of separate busses or cables may be preferable as compared to a single bus in order to improve performance or to provide other functionality such as employing other disk drive protocols within the system. This separate specialized PCMCIA interface system may use the same protocol, logic and control as described above in the preferred embodiment wherein the ATA cable, system adapter integrated circuit, and interface card were shared. Alternatively a different cable and other interface system hardware may be adapted to better support PCMCIA cards. For example a standard ATA cable requires a 40 signal ribbon cable while the signal line requirements for communication using the WIC protocol requires only a 22 signal ribbon cable. Furthermore, the system adapter 504 need only communicate using the WIC protocol and not use the additional signals within the ATA standard and thus can have a reduced pin count as well as a reduced die size when the circuitry for ATA support is removed. Thus the special PCMCIA interface system allows a system designer to use a minimum cable size and a minimum chip pin count to support PCMCIA slots.

While in the system of the preferred embodiment, only ATA and PCMCIA peripherals have been described, the present invention is not intended to be so limited. It is foreseeable that future hard disk drive technology will introduce new interface systems between the system bus and the hard disk drive and that the system adapter and socket controllers described herein can be adapted to the future interface systems and share certain hardware resources such as a cable or a bus of signal lines in order to support additional peripherals or subsystems such as PCMCIA cards or IR peripherals at a minimal cost. It should also be apparent to one skilled in the art that the principles of the present invention could be used with other types of peripherals or other types of subsystems which operate under different sets of standards and specifications, by modifying the system adapters 204 or 504 and the socket controllers 220 or 221. Other improvements and modifications which become apparent to persons of ordinary skill in the art only after reading this disclosure, the drawings and the appended claims are deemed within the spirit and scope of the present invention.

What is claimed is:

1. A status detector for a peripheral socket for coupling with a particular kind of peripheral and a system bus adapter for detecting the peripheral socket connection status from signals received from a peripheral socket and for reporting connection status changes for the peripheral socket to the system bus adapter, the status detector comprising:

a first detection circuit for detecting a first transition of selected signals received from the peripheral socket, said first detection circuit coupled to at least a single peripheral socket to receive selected signals indicative of peripheral socket connection status;

a second detection circuit for detecting second transitions of selected signals, indicative of peripheral socket connection status, received from a least a single peripheral socket, said second detection circuit coupled to at least a single peripheral socket to receive selected signals;

a notifier circuit for notifying a system bus adapter that one of a first or second transition has been detected, said notifier circuit being coupled to the first and second circuits; and a transmitter coupled to receive selected signals and to sense first and second transitions of selected signals and to transmit information regarding first and second transitions to a system bus adapter in the order received.

2. An interface apparatus for interfacing a system bus to a plurality of controllers, the interface apparatus comprising:

a plurality of peripheral specific controllers each coupleable to a corresponding plurality of peripherals of a particular kind;

an interface circuit coupled between a system bus and the plurality of peripheral specific controllers for selectively configuring for communications with correspondingly specified peripherals;

a plurality of detection circuits coupled to corresponding ones of said plurality of peripheral specific controllers for communication with said plurality of peripheral specific controllers through said interface circuit; and a status circuit coupled to a plurality of peripheral specific selected controllers and to the interface circuit for detecting and reporting changes of status of selected signals wherein the status circuit is configured repeatedly to report changes of status in time multiplexed sequence, of selected signals in order of detection to enable repeated polling of continuously connected multiple peripheral sockets.

* * * * *